United States Patent
Wood et al.

(10) Patent No.: US 12,430,167 B2
(45) Date of Patent: Sep. 30, 2025

(54) WORKFLOW-BASED SCHEDULING AND BATCHING IN MULTI-TENANT DISTRIBUTED SYSTEMS

(71) Applicant: MICROSOFT TECHNOLOGY LICENSING, LLC, Redmond, WA (US)

(72) Inventors: Adriana Wood, Redmond, WA (US); Andrei-Dumitru Blotu, Suzhou-SIP (CN); Feng Zhang, Suzhou-SIP (CN); Jingzhou Liu, Redmond, WA (US); Seshadri Mani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 677 days.

(21) Appl. No.: 17/638,077

(22) PCT Filed: Aug. 27, 2019

(86) PCT No.: PCT/CN2019/102750
§ 371 (c)(1),
(2) Date: Feb. 24, 2022

(87) PCT Pub. No.: WO2021/035517
PCT Pub. Date: Mar. 4, 2021

(65) Prior Publication Data
US 2022/0276893 A1    Sep. 1, 2022

(51) Int. Cl.
*G06F 9/48* (2006.01)
(52) U.S. Cl.
CPC .................. *G06F 9/4881* (2013.01)
(58) Field of Classification Search
CPC .................................... G06F 9/4881
See application file for complete search history.

(56) References Cited

U.S. PATENT DOCUMENTS

| | | | |
|---|---|---|---|
| 7,310,803 B2 * | 12/2007 | Haughey | G06F 9/4881 718/107 |
| 8,332,443 B2 | 12/2012 | Plancarte et al. | |

(Continued)

FOREIGN PATENT DOCUMENTS

| | | |
|---|---|---|
| CN | 103299298 A | 9/2013 |
| CN | 106095957 A | 11/2016 |

(Continued)

OTHER PUBLICATIONS

Intention to Grant received in European Application No. 19943396.2, mailed on Nov. 27, 2023, 08 pages.

(Continued)

*Primary Examiner* — Lewis A Bullock, Jr.
*Assistant Examiner* — Carlos Alberto Espana
(74) *Attorney, Agent, or Firm* — William C. Powell; Newport IP, LLC

(57) ABSTRACT

Operation requests received from a tenant are added to a tenant-specific queue. A tenant scheduling work item is added to an execution queue that is shared with other tenants. When the tenant scheduling work item is executed, it copies up to a defined number of scheduled operations from the tenant-specific queue to the execution queue. The tenant-scheduling work item then re-adds itself to the execution queue. While the operations are executed and before the tenant scheduling work item is executed again, other tenants have an opportunity to queue their own operations. The tenant scheduling work item selects scheduled operations from the tenant-specific queue in the order they were originally requested until one of several conditions is met. Conditions may be based on how many operations are in progress, what kind of operations are in progress, and/or dependencies between operations of different types.

19 Claims, 24 Drawing Sheets

(56) References Cited

U.S. PATENT DOCUMENTS

| | | | |
|---|---|---|---|
| 8,924,481 B2* | 12/2014 | Conlon | H04L 67/1001 718/103 |
| 9,417,913 B2 | 8/2016 | Booman et al. | |
| 10,063,661 B2* | 8/2018 | Jan | H04L 67/02 |
| 2001/0005853 A1* | 6/2001 | Parkes | G06F 9/4843 718/106 |
| 2006/0037018 A1 | 2/2006 | Fang et al. | |
| 2008/0172579 A1 | 7/2008 | Hahm et al. | |
| 2011/0078297 A1* | 3/2011 | Tamura | G06F 9/4843 709/223 |
| 2014/0359113 A1* | 12/2014 | Krebs | H04L 41/5009 709/224 |
| 2015/0301869 A1 | 10/2015 | Chan et al. | |
| 2017/0024248 A1 | 1/2017 | Roth et al. | |
| 2018/0121240 A1 | 5/2018 | Cai | |

FOREIGN PATENT DOCUMENTS

| | | |
|---|---|---|
| CN | 106126354 A | 11/2016 |
| CN | 106209682 A | 12/2016 |
| CN | 107430666 A | 12/2017 |
| CN | 107885600 A | 4/2018 |
| CN | 108536528 A | 9/2018 |
| CN | 109324900 A | 2/2019 |
| WO | 2014042729 A1 | 3/2014 |

OTHER PUBLICATIONS

Office Action Received for Chinese Application No. 201980091832.X, mailed on Jun. 22, 2024, 10 pages (English Translation Provided).

"Notice of Allowance Issued in European Patent Application No. 19943396.2", Mailed Date: Jul. 26, 2023, 8 Pages.

"Extended European Search Report Issued in European Patent Application No. 19943396.2", Mailed Date: Jan. 4, 2023, 5 Pages.

Decision to grant Article 97(1) received in European Application No. 19943396.2, mailed on Feb. 1, 2024, 2 Pages.

"Open Source Batch Scheduler for Hybrid and Multi-Clouds Environments", Retrieved From: https://www.activeeon.com/solutions/job-scheduling/, Retrieved on: Mar. 11, 2022, 5 Pages.

"International Search Report and Written Opinion Issued in PCT Application No. PCT/CN19/102750", Mailed Date: May 27, 2020, 9 Pages.

Verma, et al., "Quincy: Fair Scheduling for Distributed Computing Clusters", In International Journal of Innovative Research in Technology, vol. 1, Issue 7, Dec. 2014, pp. 286-294.

Zaharia, et al., "Delay Scheduling: A Simple Technique for Achieving Locality and Fairness in Cluster Scheduling", In Proceedings of the 5th European conference on Computer systems, Apr. 13, 2010, 14 Pages.

Notice of Grant Received for Chinese Application No. 201980091832.X mailed on Dec. 17, 2024, 5 pages. (English Translation Provided).

* cited by examiner

TENANT NAME 306A
URL 304A
SITE NAME 308A

300

NegaCorp HR
HTTPS://NEGACORP.COLLABORATIONSERVER.COM/TEAMS/HUMANRESOURCES/HOME

HOME | RECRUITING | INTERNS | PAYROLL | VACATION | BENEFITS

NegaCorp HR
*A Family Owned Business Working for Families since 1923*

SEARCH...

HOME
RECRUITING
INTERNS
PAYROLL
VACATION
BENEFITS

HOME

| NAME ∨ | MODIFIED ∨ | MODIFIED BY ∨ | CHECKED OUT TO ∨ |
|---|---|---|---|
| DOCUMENT AND EMAILS ARCHIVE | APRIL 2, 2019 | STEVE | |
| PROCEDURES | JUNE 15, 2019 | BRAD | |
| CORPORATE POLICIES | MAY 22, 2018 | STEVE | |
| RESUMES | APRIL 17, 2019 | STEVE | |
| NEW EMPLOYEE HANDBOOK | JAN 3, 2018 | SALLY | |
| NEW EMPLOYEE START DATES | AUG 13, 2019 | JEN | |
| VACATION POLICY | NOV 30, 2017 | STEVE | |

WEB PAGE 302

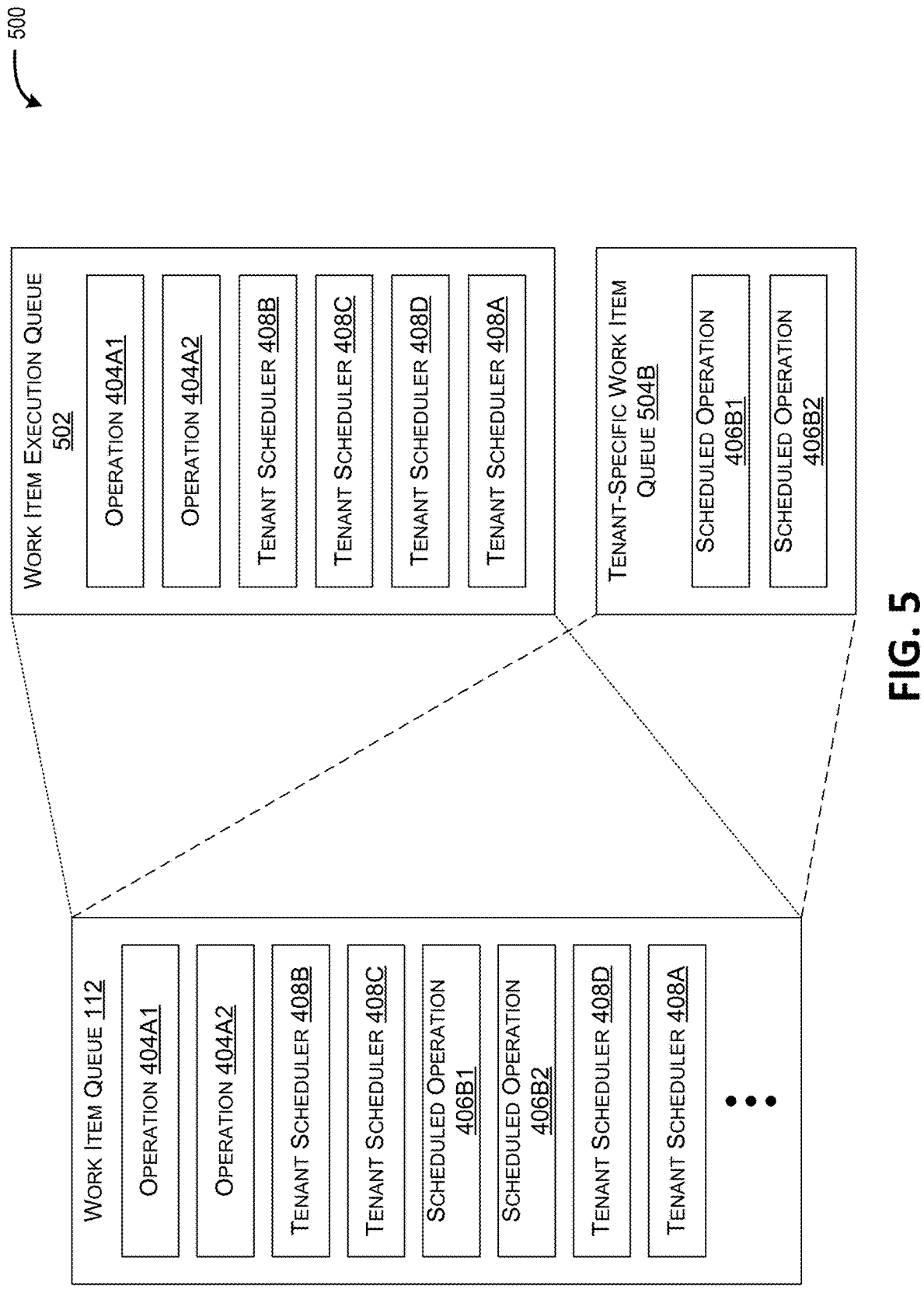

WORKFLOW-BASED SCHEDULING AND BATCHING IN MULTI-TENANT DISTRIBUTED SYSTEMS

CROSS-REFERENCE TO RELATED APPLICATION

This application is a national stage application, filed under 35 U.S.C. § 371, of International Patent Application No. PCT/CN2019/102750, filed on Aug. 27, 2019, which is incorporated by reference herein in its entirety.

BACKGROUND

Scalability and fairness in the allocation of computing resources are ongoing technological challenges for multi-tenant distributed systems. Traditional distributed systems are single tenant, i.e. each deployment served a single customer, and so fairness was not an issue. And, while scalability was a concern, by nature of having a single customer, single-tenant systems had more predictable and stable resource requirements.

Multi-tenant systems, where each deployment serves multiple customers, are prone to over-allocating resources to one tenant and starving the rest. This lack of fairness causes a poor user experience for users of the starved tenants. At the same time, multi-tenant systems tend to have higher workloads than single-tenant systems, and so scaling tends to be a bigger challenge.

Multi-tenant systems are often deployed to a server farm—a collection of compute nodes, storage, network bandwidth, and other computing resources. In order to utilize the compute nodes efficiently, a distributed system may queue work items for consumption by the compute nodes. As a compute node completes a work item, it requests another work item from die queue. In this way, compute nodes are kept busy, improving system efficiency.

However, some tenants may request thousands if not millions of operations in a short period of time Queuing these operations to be processed sequentially may stall the remaining tenants tor minutes or even hours at a time. This unfairness leads to a poor customer experience, and depending on whether a service level agreement is in place, may have financial consequences. Starving the remaining tenants for resources may also cause tire server farm to perform less efficiently, as users of stalled tenants may retry their stalled operation many times, consuming additional bandwidth and processing capacity In severe cases, the retries may consume so much bandwidth and processing capacity that the distributed system crashes and needs to be restarted.

One challenge to scaling multi-tenant systems is efficiently and correctly processing operations with dependencies. For example, application specific operations, e.g. renaming a mailbox in an email system, may cause data corruption if it is executed while a tenant level operation, e.g. renaming the tenant associated with the email system, is in progress. At the same time, while naively processing every operation from a given tenant in series may avoid correctness issues, performance, and therefore scalability, will be diminished.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

One goal of the disclosed configurations is load balancing user requested operations Load balancing may be achieved in part by batching requested operations By democratically executing batches of operations from different tenants, resource utilization fairness is improved.

In some configurations, operation requests received from a tenant are added as work items to an execution queue. The work items may be added in batches. After a batch has been processed by one or more compute nodes, another batch may be added to the execution queue. By not queuing the next batch until the current batch is processed, other tenants have time to have their operations added to the execution queue, promoting fair access to computing resources. Batches are selected in a way that maximizes throughput without risking data corruption.

For example, a tenant administrator may wish to rename all web pages hosted in a collaboration system. To do this, the tenant administrator may send a rename operation request for each web page. For large tenants, this could amount to millions of rename requests. If these operations were added to the system's execution queue as they arrived, all of the farm's resources could be consumed performing operations for a single tenant for an unacceptably long period of time. Other tenants would be starved for resources as the millions of operations were processed.

To address this concern, in one configuration, operations are first added as work items to a tenant-specific work item queue (hereafter 'tenant queue'). Operations that have been added to a tenant queue are considered to be scheduled, in that the operation is scheduled to be executed at a later time. Operations wait in the tenant queue until they are moved, one batch at a time, to the execution queue for processing, in some configurations, the tenant queue and the execution queue are stored in the same database table, using an 'OperationType' column to distinguish which queue a given work item belongs to.

Scheduled operations may be moved from the tenant queue to the execution queue by a novel type of work item—a tenant scheduling work item (hereafter 'tenant scheduler'). The tenant scheduler may be placed in the execution queue alongside operations and other work items. When executed by a compute node, the tenant scheduler selects a batch of scheduled operations from that tenant's queue and adds them to the execution queue. The tenant scheduler then re-adds itself to the execution queue, causing itself to be executed again after all operations in the batch have started. In this way, the tenant scheduler iteratively adds batches of operations to the execution queue. In the intervening time between iterations of the tenant scheduler, other tenants have an opportunity to queue their own operations, allowing fair access to farm resources.

In some configurations, the tenant scheduler may batch operations in the order they were added to the tenant queue, i.e. without re-ordering or skipping an operation. The tenant scheduler may add operations to the batch until one of several conditions are met. Once one of the conditions is met, the tenant scheduler may move the batch of operations to the execution queue.

In some configurations, one condition is met when the number of operations in the execution queue plus the number of operations already in the batch is greater than or equal to a defined number A similar condition is met when the number of operations in the execution queue plus the number of operations in progress plus the number of operations already in the batch is greater than or equal to a defined number. The defined number may be calibrated to balance the efficiencies of batching larger numbers of operations against the drawback of starving other tenants for resources. One value of the defined number used in practice is 100, although any other value is similarly contemplated.

In some configurations, one condition is met when an operation could cause data corruption if it were executed in parallel with operations that are already in progress, queued, or added to the batch. The tenant scheduler may detect the possibility of data corruption by comparing the type of operation at the head of the tenant queue to the types of operations that are in progress, in the execution queue, or already added to the batch. For example, an application specific operation, such as renaming a folder in an email system, may cause data corruption if it is executed while a tenant level operation, e.g. tenant rename, tenant move, etc., is in progress. As such, the tenant scheduler may stop adding operations to the batch if it encounters an application specific operation while a tenant level operation is in progress, in the execution queue, or already added to the batch.

In some configurations, one condition is met whenever a tenant level operation is in progress—i.e. a tenant level operation is being executed by a compute node. By not batching any operations when a tenant level operation is in progress, tenant level operations are serialized, i.e. an in-progress tenant level operation is allowed to finish before another tenant level operation can be added to the execution queue. Similarly, application specific operations are not added to the execution queue until the in-progress tenant level operation completes. This prevents data corruption, as an application specific operation may be invalided by the in-progress tenant level operation.

Additionally, or alternatively, another condition is met when there is an existing tenant level operation in the execution queue and one or more m-progress application specific operations. In this scenario, the in-progress application specific operations will be allowed to finish, after which die tenant level operation will execute. According to the "do nothing when a tenant-level operation is in progress" rule described above, the tenant level operation will then execute completely before another scheduled operation of any type is added to the execution queue.

By adhering to some or all of the conditions listed above, the tenant scheduler balances the need tor throughput against the requirement for data integrity Specifically, operations that, can be safely executed in parallel are allowed to do so, while potentially corrupting operations are executed in series. As such, batching operations for execution as described herein improves scalability of the system in addition to ensuring fairness across tenants. Technical benefits other than those described herein might also be realized from implementations of the disclosed technologies.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identity key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items References made to individual items of a plurality of items can use a reference number with a letter of a sequence of letters to refer to each individual item. Generic references to the items may use the specific reference number without the sequence of letters.

FIG. 3A is an illustration of a web page generated by a collaboration server before a site rename operation and/or a tenant rename operation has occurred.

FIG. 3B is an illustration of a web page rendered by a collaboration server after a site rename operation and/or a tenant rename operation has occurred.

FIG. 5 is a block diagram illustrating a work item execution queue and a tenant-specific work item queue as stored in the same work item queue.

DETAILED DESCRIPTION

The technologies disclosed herein provide for improvements in the implementation of workflow-based scheduling and batching in multi-tenant distributed systems. In some embodiments, the distributed systems are implemented in data centers, server farms, or other networked environments, including those that provide virtualized services. The disclosed techniques may improve fairness of access to computing resources. The disclosed techniques may also increase performance and scalability by increasing parallelization in a way that docs not cause data corruption. The disclosed technologies might also provide other technical benefits other than those described herein.

Figure 1:
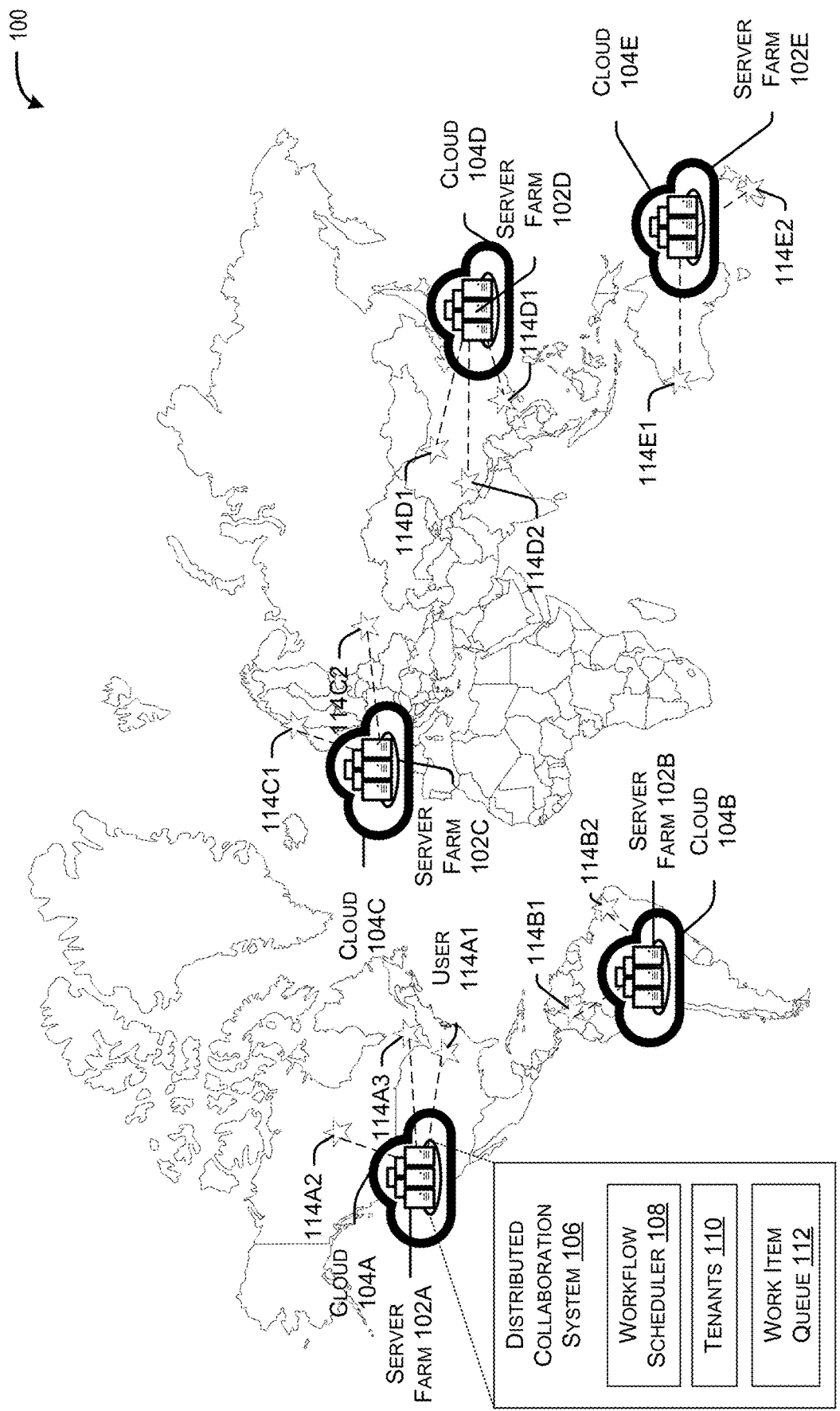
FIG. 1 is a block diagram illustrating a distributed collaboration system containing a workflow scheduler, as disclosed herein.

FIG. 1 is a block diagram 100 illustrating a distributed collaboration system 106 containing a workflow scheduler 108. Distributed collaboration system 106 is depicted as executing on server farm 102A, which is located within computing cloud 104A Distributed collaboration system 106 may include one or more tenants 110 and a work item queue 114 in addition to workflow scheduler 108.

FIG. 1 illustrates multiple computing clouds 104 hosting multiple server farms 104 around the world Distributed collaboration system 106 is depicted as deployed to server farm 104A, but distributed collaboration system 106 may collaborate with other deployments of distributed collaboration system 106 in other server farms 102. Distributed collaboration system 106 is distributed in that it executes across multiple computing devices in a server farm 102—collaborating with other deployments in other server farms is an additional layer of distribution, but is not necessary to implement some of the techniques disclosed herein.

FIG. 1 also illustrates users 114, each of which is associated with a particular deployment of distributed collaboration system 106. While there is no physical limitation preventing a user in any part of the world from being associated with a deployment in any server farm 102, users are frequently associated with a tenant that is located in the same geographic region as the server farm 102. This arrangement may be made to satisfy regulatory requirements in different jurisdictions, for administrative convenience, etc.

In some configurations, distributed collaboration system 106 is used to share documents and files, host web sites, and enable legal, information management, and process requirements of the organization deploying it. Examples of collaboration systems include Microsoft Share Point™, Google Drive™, Atlassian Confluence™, Box for Business™, and Drupal™. However, other types of distributed systems are similarly contemplated, including distributed email servers, web servers, application servers, or any other type of application that can run in a distributed environment.

In some configurations, distributed collaboration system 106 is multi-tenant, in that a single deployment serves multiple tenants. This contrasts with a single tenant deployment, in which the single deployment serves a single tenant. Multi-tenant deployments share resources between tenants, often in die same computing cloud 104 or server farm 102, while single tenant deployments use dedicated resources for the one tenant and are more likely to be installed in on-premise locations. Multi-tenant deployments have several advantages, including better resource utilization due to resource sharing. In contrast, single tenant deployments typically are over-provisioned to account for infrequent periods of largo demand, capacity that is otherwise wasted. Other benefits of multi-tenant deployments include lowered administrative overhead, lower electricity costs, and professionally managed security.

In some configurations, a tenant refers to a corporate, government, or non-profit entity, or any other collection of individuals that have sought to use the distributed collaboration system 106. Each tenant of distributed collaboration server 106 may be associated with a name, e.g. "NegaCorp". The tenant name may be used to identify the tenant for purposes of administrative functions. The tenant name may also be incorporated into an address, such as a Universal Resource Locator (URL), of die tenant and any items stored in the tenant.

Figure 2:
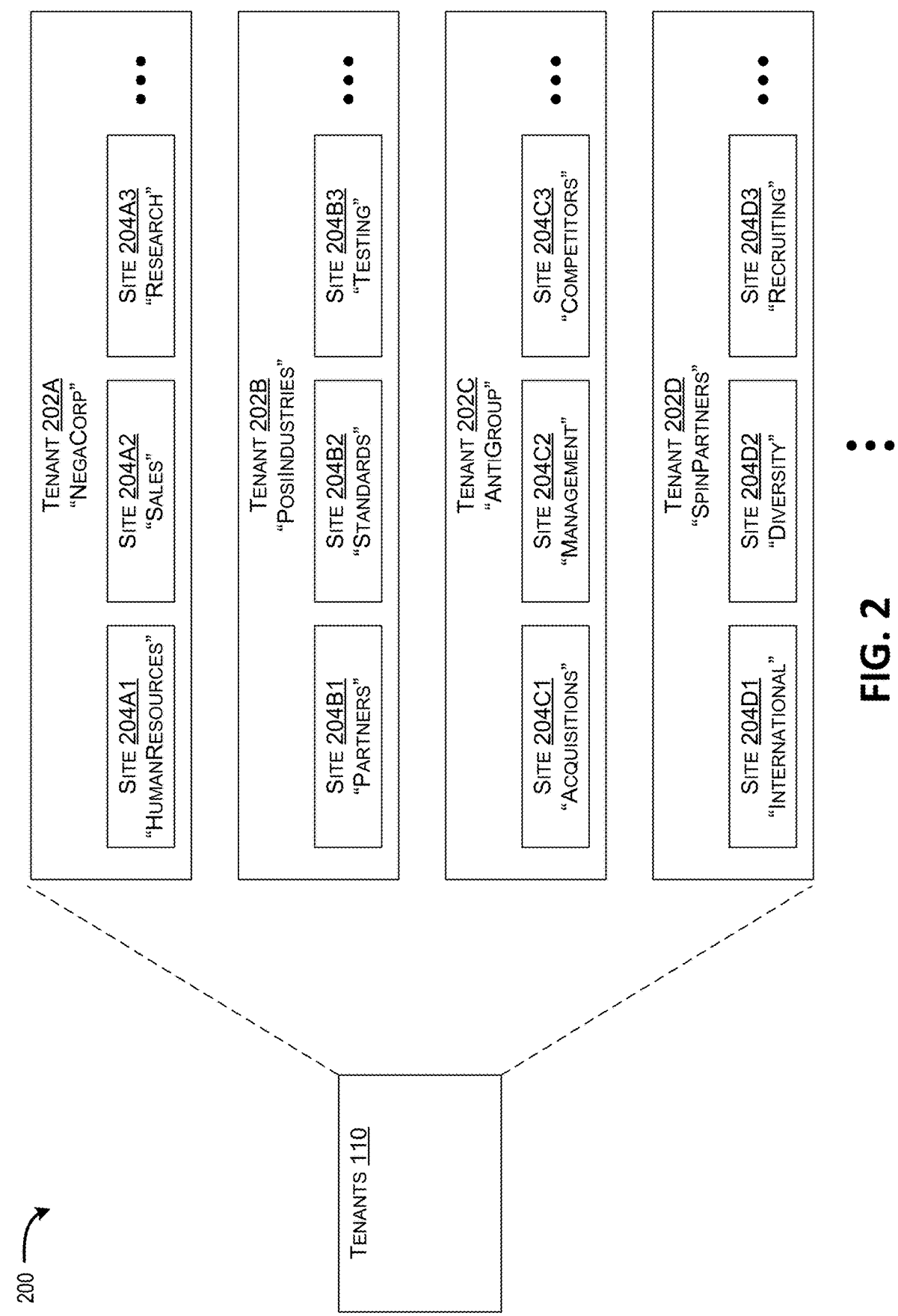
FIG. 2 is a block diagram illustrating an example list of tenants associated with a distributed collaboration system.

FIG. 2 is a block diagram 200 illustrating an example list of tenants 110 associated with distributed collaboration system 106. In some configurations, each tenant 202 represents a different entity that uses distributed collaboration system 106. e.g. "NegaCorp", "PosiIndustries", "Anti-Group", and "SpinPartners". While four tenants are listed, this is for illustrative purposes only—hundreds of thousands or millions of tenants may be supported by a single deployment of distributed collaboration system 106.

In some configurations, collaboration systems allow a tenant to establish multiple sues 204. Each site may represent a self-contained unit of functionality usable by a team within the tenant's organization. For example. "NegaCorp" has sires 204A1, "HumanResources", site 204A2. "Sales", and site 204A3. "Research". Each site may operate independent of the others. For example, documents, files, lists, websites, and other items stored tor the "HumanResources" site 204A1 may be independent, logically or physically, from documents, files, lists, websites, and other items stored for the "Sales" site 204A2.

In some configurations, each site stones items in a different database. In another configuration, items from different sites within a tenant are stored in the same database, but are sharded based on the site name into different database partitions. In some configurations, site operations are one example of application specific operations, m distinction to tenant level operations, as discussed below in conjunction with FIG. 3B.

FIG. 3A is an illustration 300 of a web page 302 generated by a collaboration server 106 before a site rename operation and/or a tenant rename operation has occurred. URL 304A is an example of a URL that a user may employ to navigate to a particular site of a particular tenant, in this example, the site is named "HumanResources", and the tenant is named "NegaCorp."

Figure 3B:
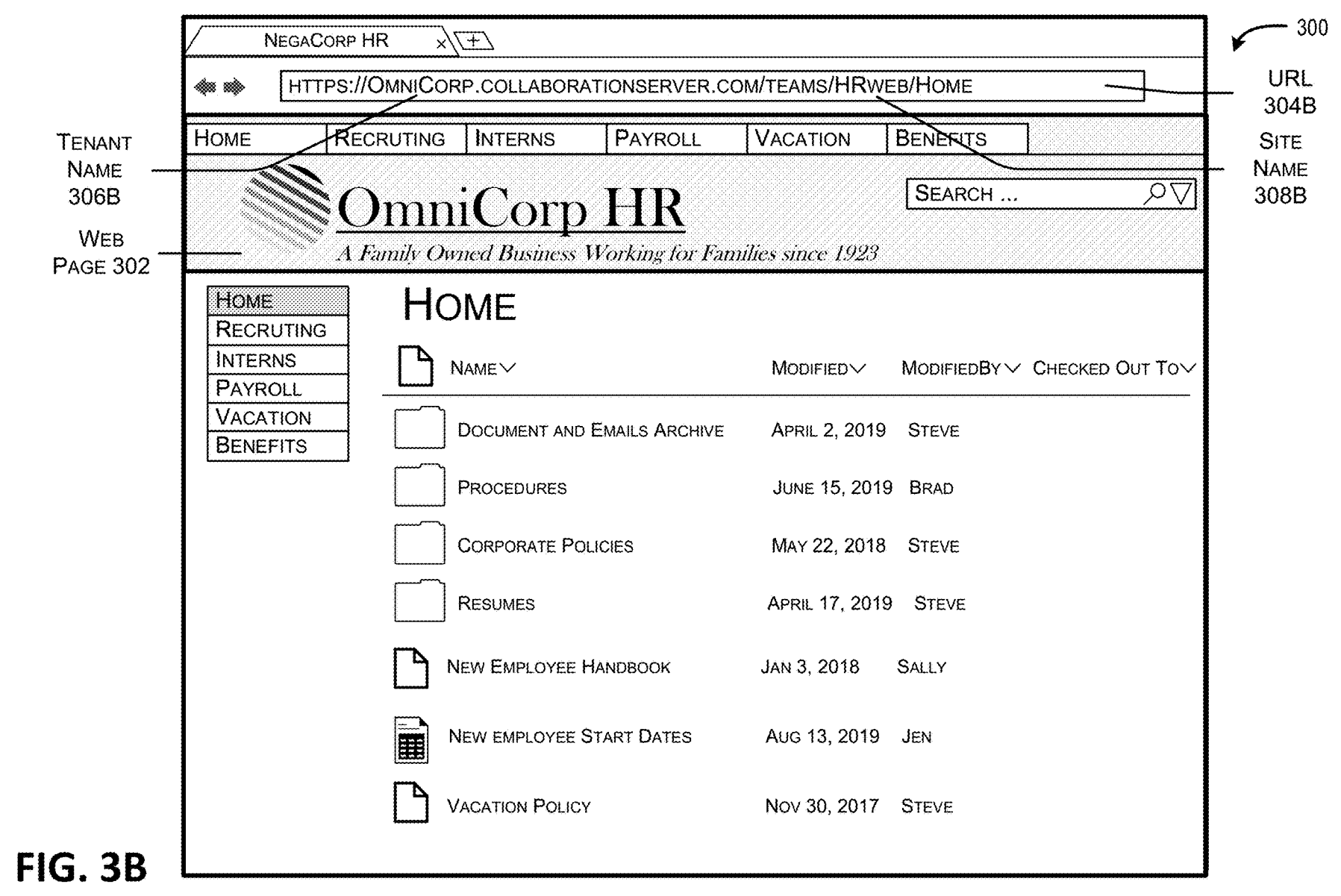

FIG. 3B is an illustration 300 of web page 302 generated by a collaboration server 106 after a site rename operation and/or a tenant rename operation has occurred Specifically, the tenant name "NegaCorp" has been replaced with the name "OmniCorp", and the site name "Human Resources" has been replaced with "HR Web". These operations may be been performed independently of each other, e.g. a tenant rename operation could have been performed without a site rename operation, and vice-versa.

Distributed collaboration system 106 may support operations beyond tenant rename and site rename. Some operations may be administrative, like provisioning a tenant, provisioning a site, deleting a tenant, deleting a site, adding/updating a user, etc. Other operations may reflect user operations, such as renaming a file, moving a file, updating a contact list editing a document, or the like.

As discussed briefly above, operations may also be classified as tenant level or application specific Tenant level operations are related to the tenant and its operation. Tenant level operations am often similar if not the same across different types of systems. For example, tenant provisioning, tenant rename, and tenant move are all equally applicable to a distributed collaboration system as they are to a distributed email system, a distributed source control server system, or the like. On the other hand, application specific operations are particular to the type of system. An email server system mas support folder rename, calendar operations, and other email-specific operations, while a collaboration server may allow sites to be renamed or moved, or for files, documents, lists, and other items to be created, deleted, renamed, etc.

In some configurations, distributed collaboration system 106 supports multiple sites within a given tenant. Users may have access to different sites within die tenant, but files, documents, lists, and other items from different sites may be stored in separate silos. For example, each site provisioned by a tenant may have a distinct database, data store, or other mechanism for storing data. In other configurations, each site provisioned by a tenant may use a single database, but shard items according to site name—i.e. store items from each site in a distinct physical storage location.

Figure 4:
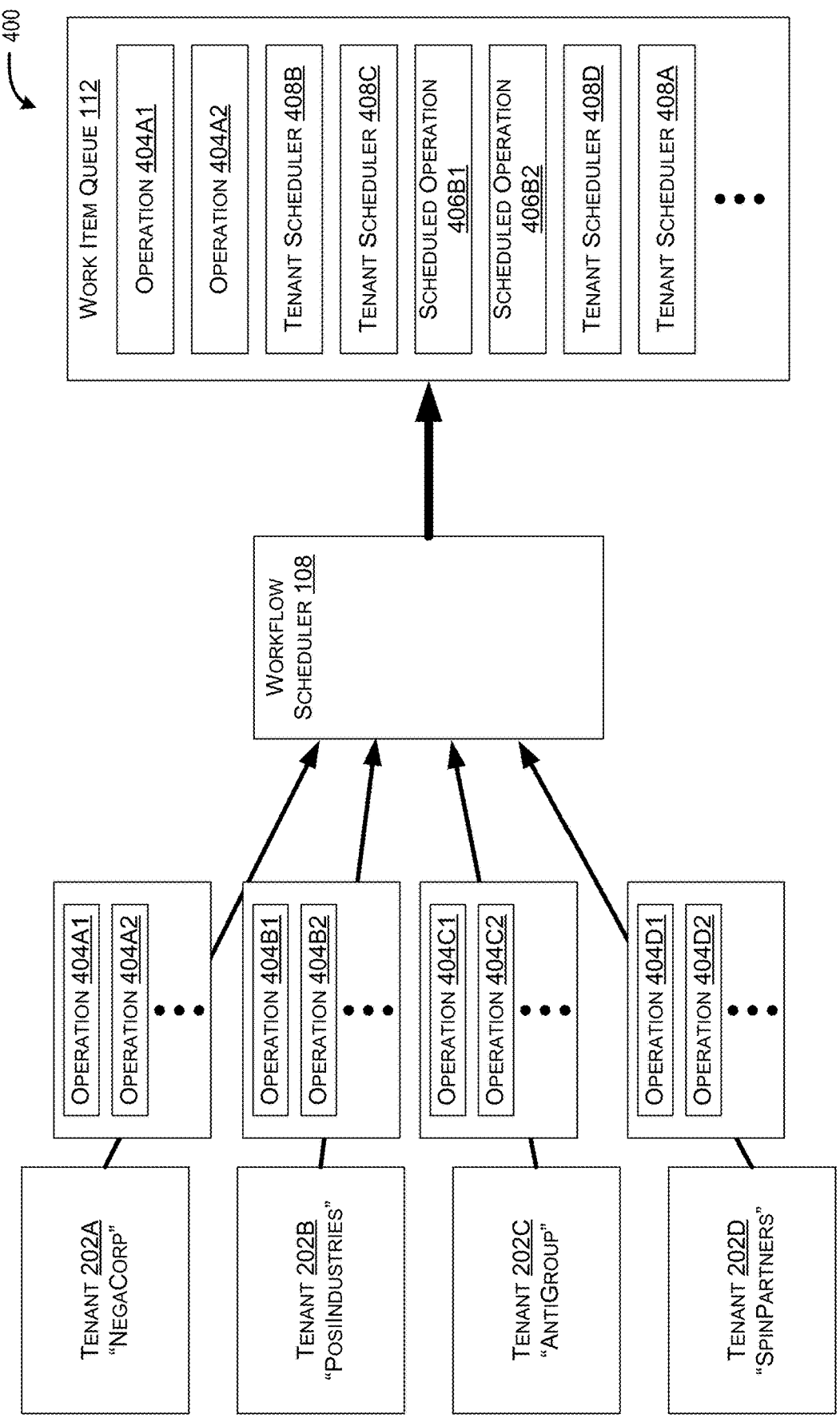
FIG. 4 is a block diagram illustrating an example of a workflow scheduler queuing operations received from multiple tenants.

FIG. 4 is a block diagram 400 illustrating an example of a workflow scheduler 108 queuing operations 404 received from multiple tenants 202. In some configurations, users of tenants 202 send operations 404 to workflow scheduler 108. A single user, e.g. an administrator, may send many operations at once. For example, a tenant administrator may enforce a document retention policy by deleting hundreds, thousands, or millions of documents within the tenant (or within sites that are part of the tenant) with a single command. In other cases, many tenant users operating concurrently may each send operations. Using a technique described in conjunction with FIGS. 6-8; workflow scheduler 108 breaks operation requests from different tenants into batches, interleaving them into work item queue 112 for processing In some configurations, work item queue 112 processes any type of work item supported by distributed collaboration system 106. The most straightforward example of a work item is a requested operation, e.g. tenant rename, document move, gram access to a user, etc. In some cases, a requested operation may be implemented with multiple work items. For example, an operation to migrate a user to a different geographical region may involve freezing the user's account, restoring the user's account in the destination region, and finally deleting the user's account in the originating region. Each of these actions may be performed by a different work item, the freezing and deleting actions being performed by the local distributed collaboration system 106, while the restoring action would be performed by a remote distributed collaboration system Operations that are implemented with multiple work items may include conditions on each work item that the tenant scheduler will check before adding a work item to a batch.

Another type of work item is the novel tenant scheduling work item. e.g. tenant scheduler 408. Tenant scheduler 408 is created by workflow scheduler 108 to achieve fairness between tenants and improved performance, as discussed herein. For example, instead of adding operations 404B directly to work item queue 112 for execution by compute nodes, workflow scheduler 108 has enqueued tenant scheduler 408B into work item queue 112. When executed by a compute node, workflow scheduler 108 may select a batch of scheduled operations 406B to be added to work item queue 112. In this way, instead of adding thousands or even millions of operations to work item queue 112 as they are received from a particular tenant, raising the possibility of starving other tenants for resources, tenant scheduler 408 iterative adds a batch of operations to work item queue 112, and then adds itself to work item queue 112 so as to be executed again at a later time.

FIG. 5 is a block diagram 500 illustrating a work item execution queue 502 and a tenant-specific work item queue 504B as stored in the same work item queue 112. In some configurations, each tenant is assigned a tenant-specific work item queue 504, e.g. tenant 202A corresponds to tenant-specific work item queue 504A, tenant 202B corresponds to tenant-specific work item queue 504B, etc.

In some configurations, work item queue 112 is stored as a database table. Each entry in the work item database table may have an operation type column (e.g. 'OperationType') that can be used to determine whether a work item is part of work item execution queue 502 (herein after 'execution queue' 502) or one of the tenant-specific work item queues 504 (herein after 'tenant-specific queue' 504). For example, a value of the 'OperationType' column may be 'TenantQueue' if the work item is an operation queued in a tenant-specific queue 504. If OperationType is instead "ExecutionQueue", the work item is currently in execution queue 502.

In some configurations, the database table underlying work item queue 112 includes a parent ID column (e.g. 'ParentId') that indicates which tenant a work item is associated with. In some cases, the 'ParentId' column refers to die tenant scheduler that has, is, or will schedule the work item to be executed. When the value of the 'OperationType' column is 'TenantQueue', the 'ParentId' column can be used to determine which tenant specific queue 504 a work item is associated with.

Figure 6A:
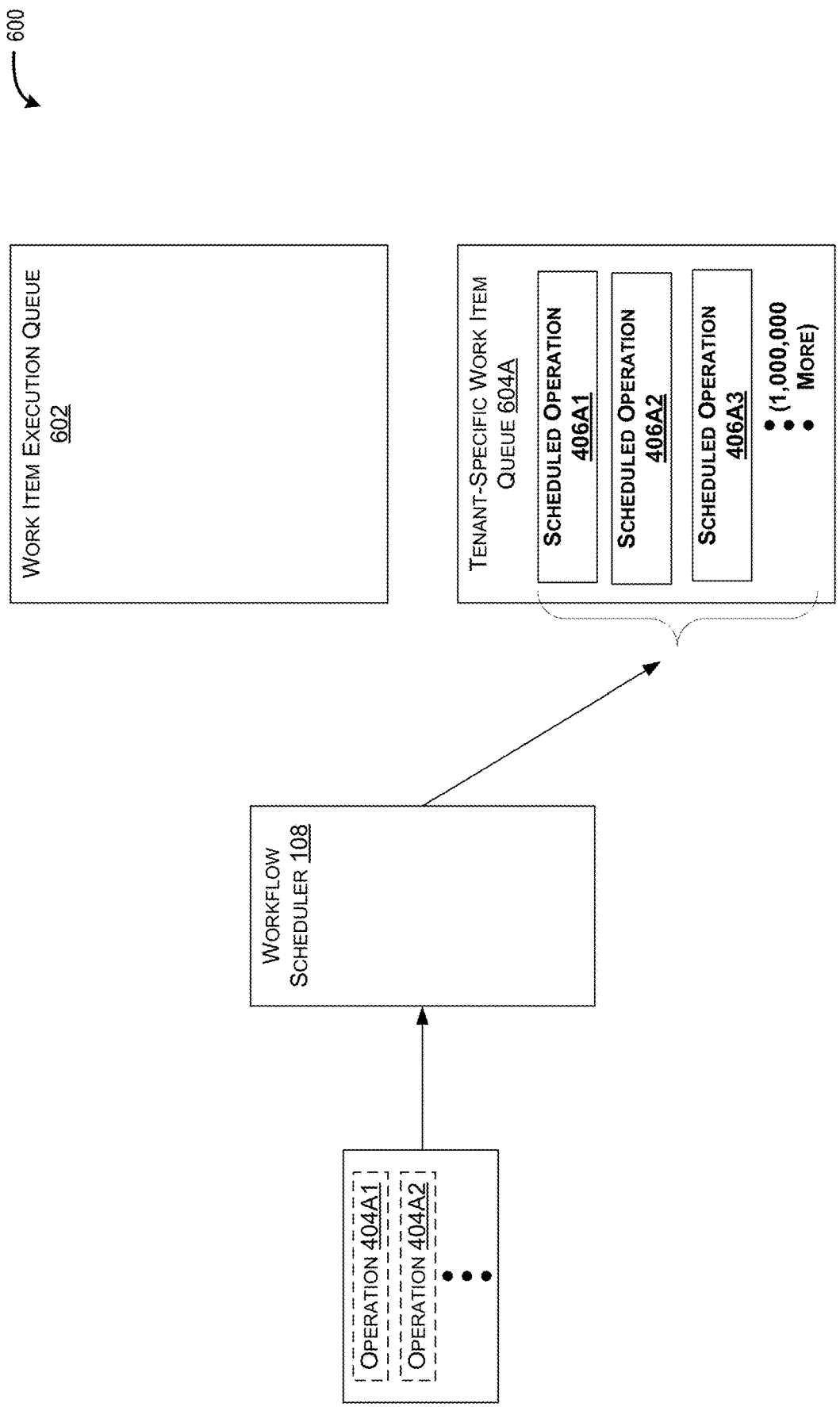
FIG. 6A is a block diagram illustrating a workflow scheduler adding requested operations to a tenant-specific queue.

FIG. 6A is a block diagram 600 illustrating a workflow scheduler 108 adding requested operations 404A to a tenant-specific queue 604A Requested operations 404A may be received from one or more users of tenant 202A. Requested operations 404A may ail arrive in a single request, one operation per request, or more than one operation per request. As depicted, workflow scheduler 108 has received 1,000,003 requested operations, and has queued all of them in corresponding tenant-specific queue 604A.

Figure 6B:
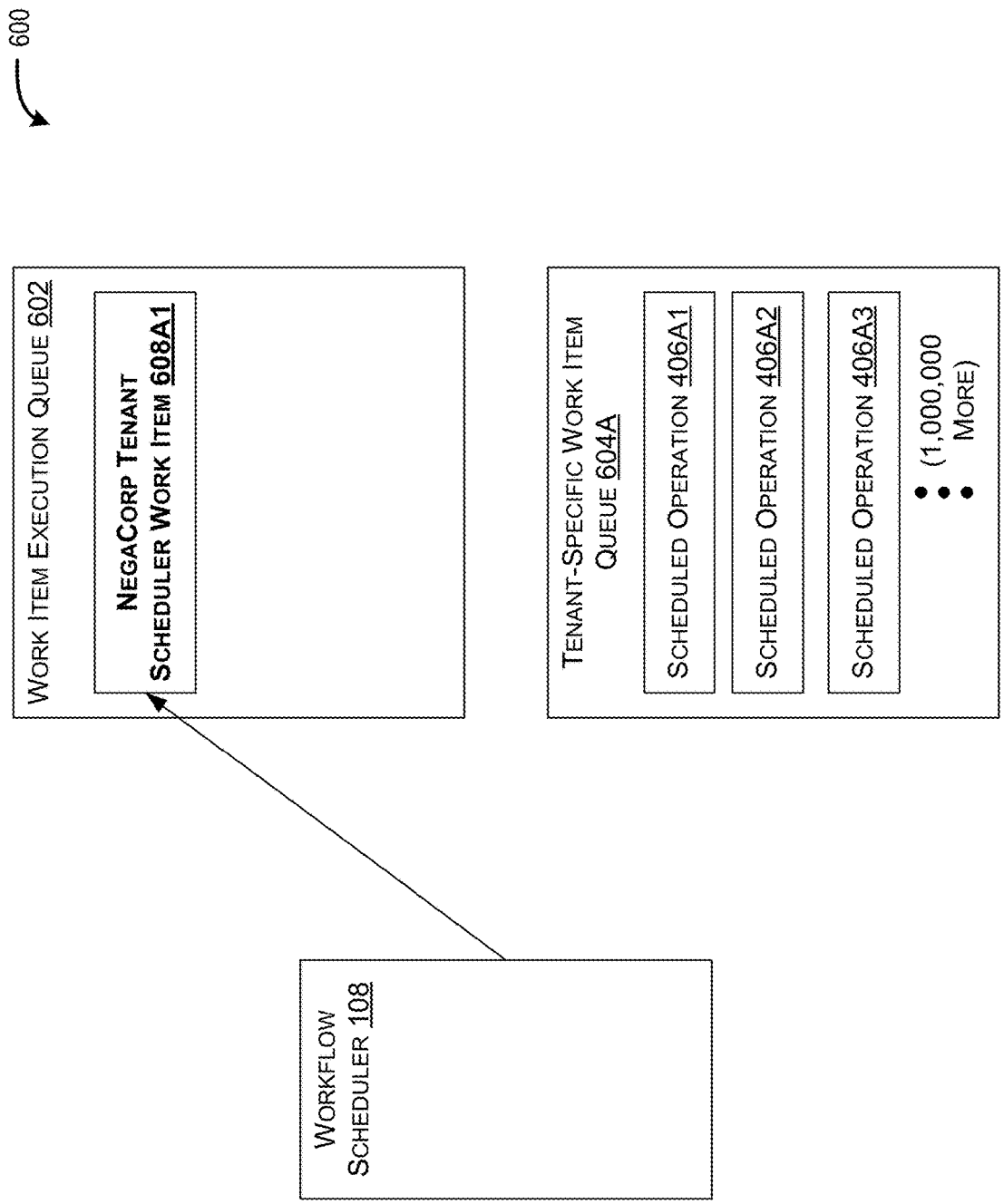
FIG. 6B is a block diagram illustrating a workflow scheduler add mg a tenant scheduler work item to an execution queue.

FIG. 6B is a block diagram 600 illustrating a workflow scheduler 108 adding a tenant scheduler work item 608A1 to an execution queue 602. FIG. 6B illustrates tenant scheduler 608A1 as "NegaCorp tenant scheduler work item 608A1".

"NegaCorp" is depicted in FIG. 6B to clarify the relationship between tenant scheduler 608A1 and tenant 202A—the name "NegaCorp" is not necessarily stored in execution queue 602 or the underlying work item table.

Figure 7A:
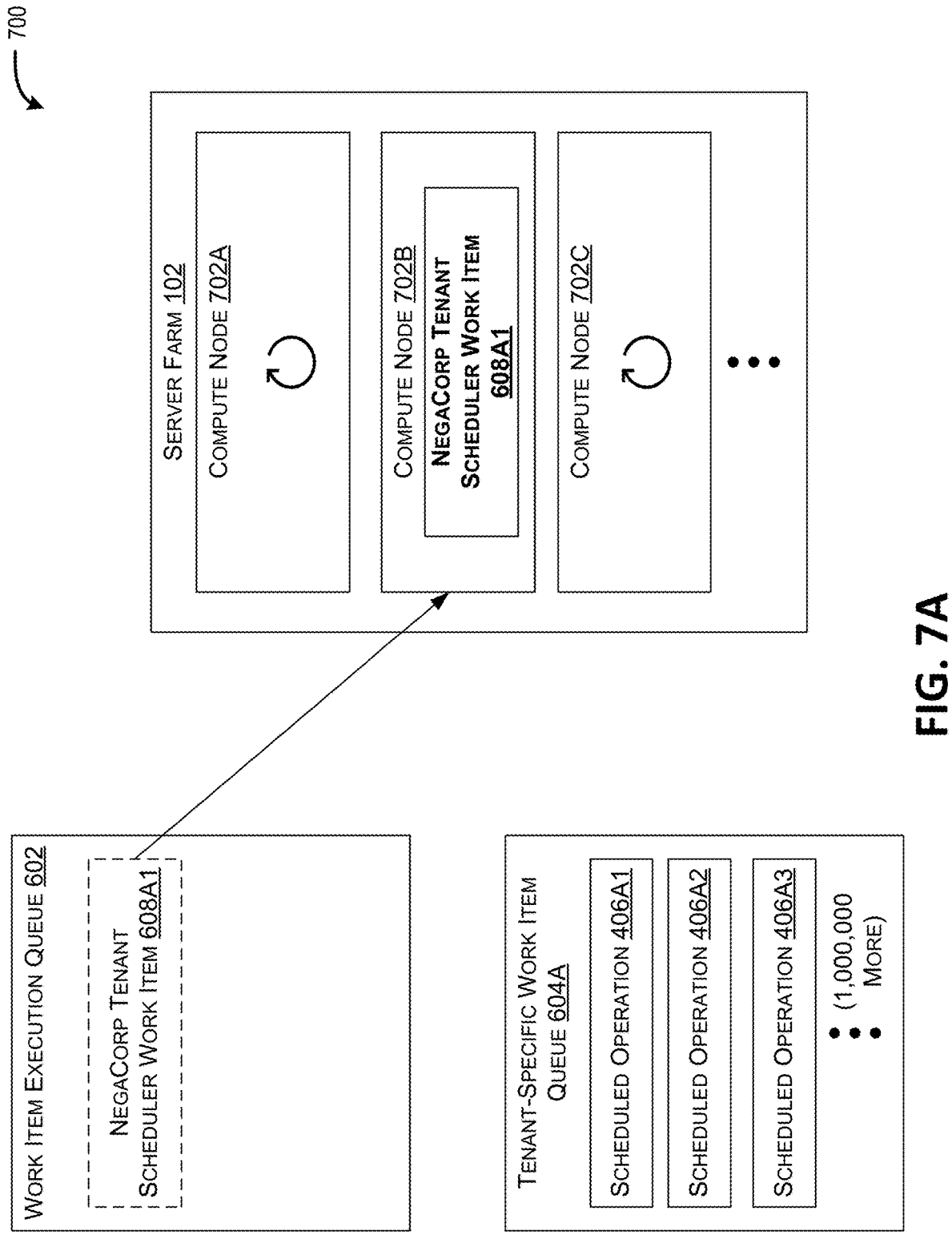
FIG. 7A is a block diagram illustrating a compute node retrieving and executing a tenant scheduler.

FIG. 7A is a block diagram 700 illustrating a compute node 702B retrieving and executing tenant scheduler 608A1. FIGS. 7 and 8 continue the same example that began with FIG. 6. In some configurations, compute nodes 702 are computing devices within server farm 102A that retrieve and execute work items from the head of execution queue 602. In some configurations, compute nodes 702 are virtual machines, while in other cases compute nodes 702 are real, physical machines Compute nodes 702 may iteratively check execution queue 602 for an available work item and execute it if possible. In this way, compute nodes 702 may execute operations requested by a tenant, tenant schedulers, and other work item types.

Figure 7B:
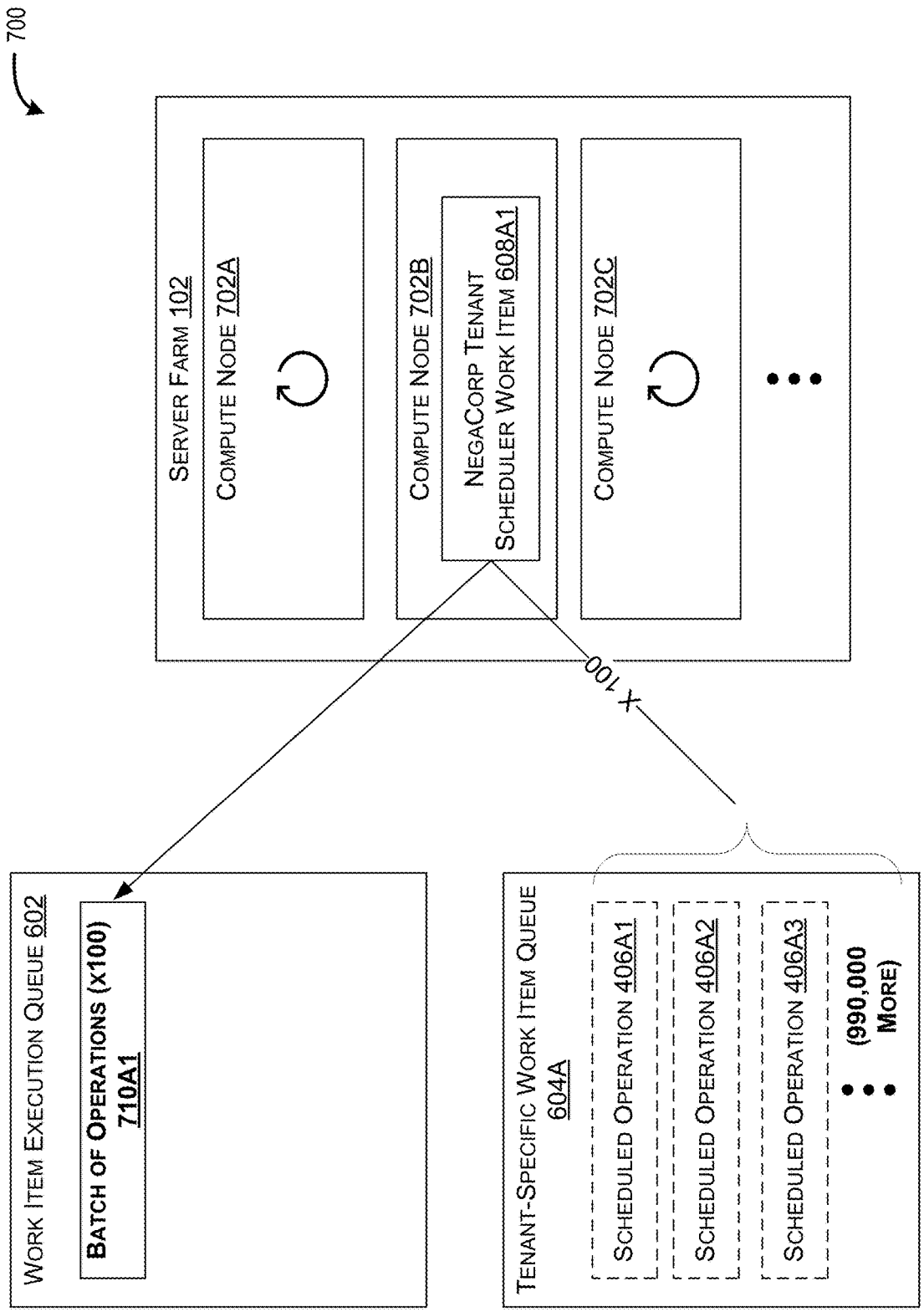
FIG. 7B is a block diagram illustrating a compute node executing a tenant scheduler to copy scheduled operations from the tenant queue to the execution queue.

FIG. 7B is a block diagram 700 illustrating a compute node 702B executing a tenant scheduler 108 to copy scheduled operations 406A from tenant queue 604A to the execution queue 602. In some configurations, up to a defined number of scheduled operations 406A are retrieved and added as a batch to execution queue 602. As depicted, tenant scheduler 608A1 retrieves 100 scheduled operations from tenant specific queue 604A and copies them to execution queue 602 as batch of operations 710A1 (×100).

Figure 7C:
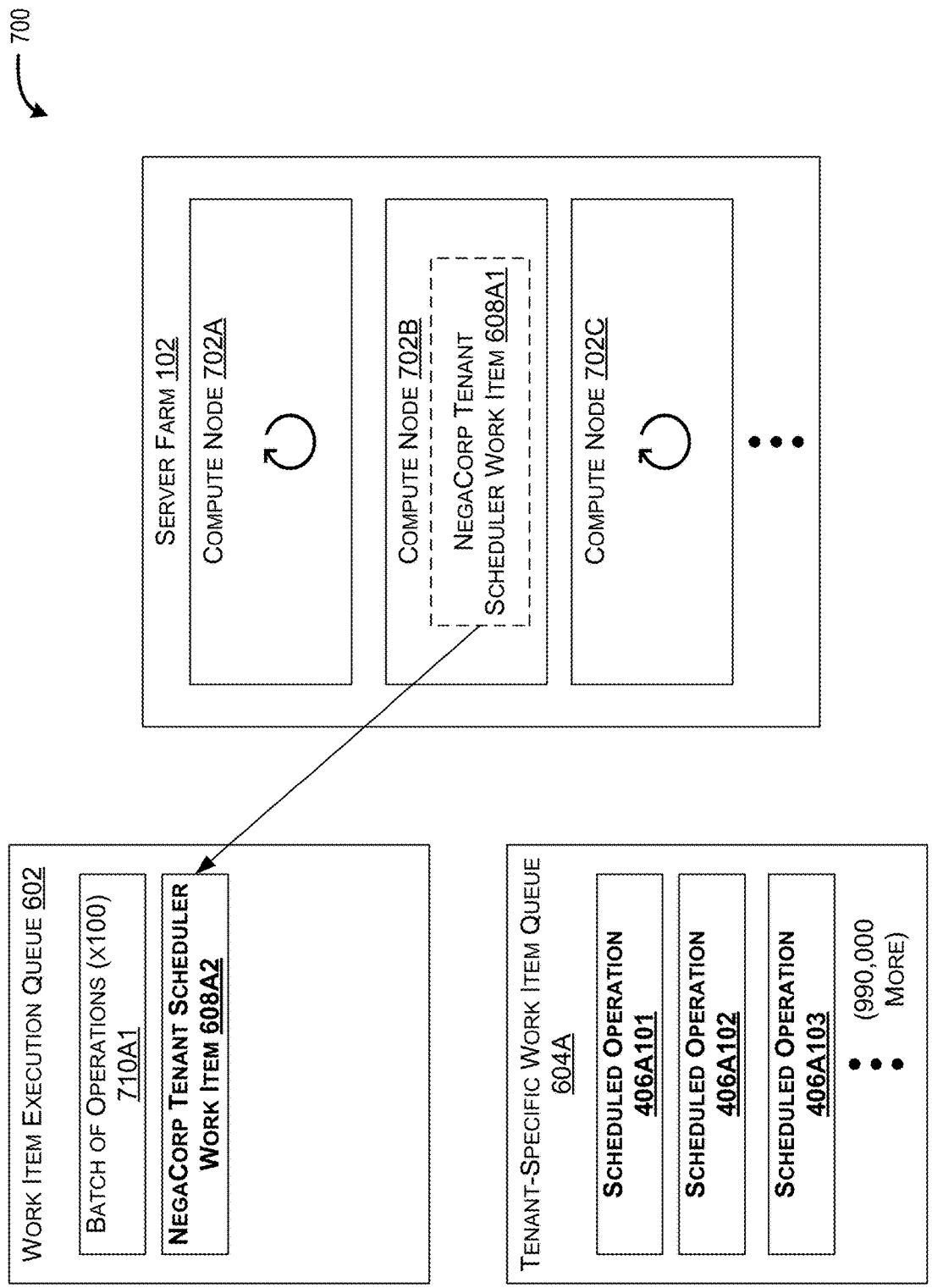
FIG. 7C is a block diagram illustrating a compute node executing a tenant scheduler to re-add itself into the execution queue.

FIG. 7C is a block diagram 700 illustrating a compute node 702B executing a tenant scheduler 608A1 to re-add itself to the execution queue 602. In some configurations, tenant scheduler 608A1 makes a copy of itself as tenant scheduler 608A2 in execution queue 602. In other configurations, tenant scheduler 608A1 creates a new instance of tenant scheduler 608A associated with tenant 202A.

In some configurations, by re-adding tenant scheduler 608A2 to execution queue 602, tenant scheduler 608A2 will be executed a second time. When it is executed, tenant scheduler 608A2 will add additional scheduled operations 406A to execution queue 602 and may re-add itself to execution queue 602 again if tenant 202A has remaining unprocessed operations. In tins way, scheduled operations 406A are iteratively added to execution queue 602, allowing other tenants to access execution queue 602 without being starved for resources.

Figure 7D:
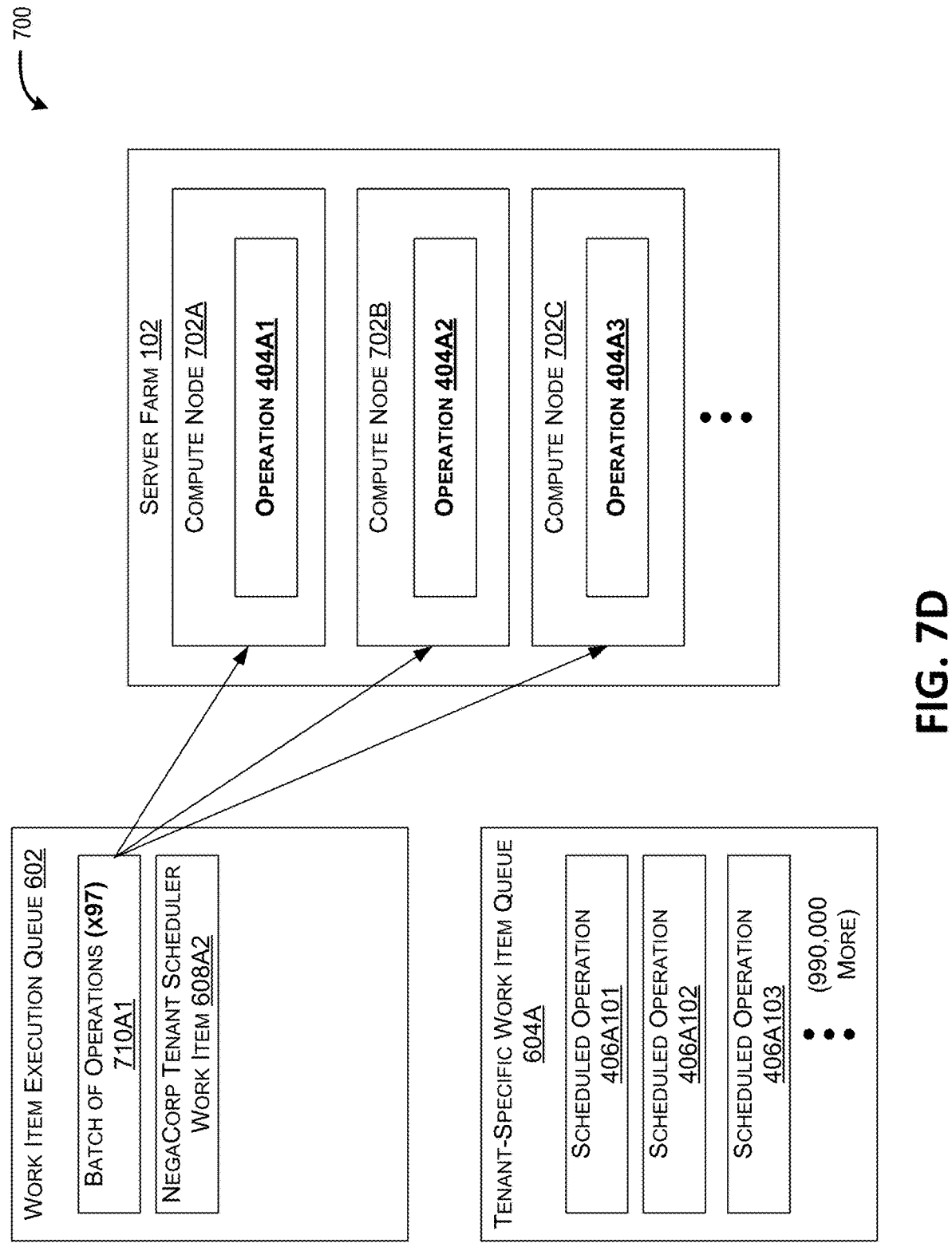
FIG. 7D is a block diagram illustrating compute nodes executing queued operations.

FIG. 7D is a block diagram 700 illustrating compute nodes 702 executing queued operations 404A. As depicted, the queued operations 404A being executed are part of the batch of queued operation 710A. As depicted, each of compute nodes 702A, 702B, and 702C have downloaded and are executing one of queued operations 404A1, 404A2, and 404A3. 97 of the original 100 queued operations remain in tire batch of operations 710A.

Figure 8A:
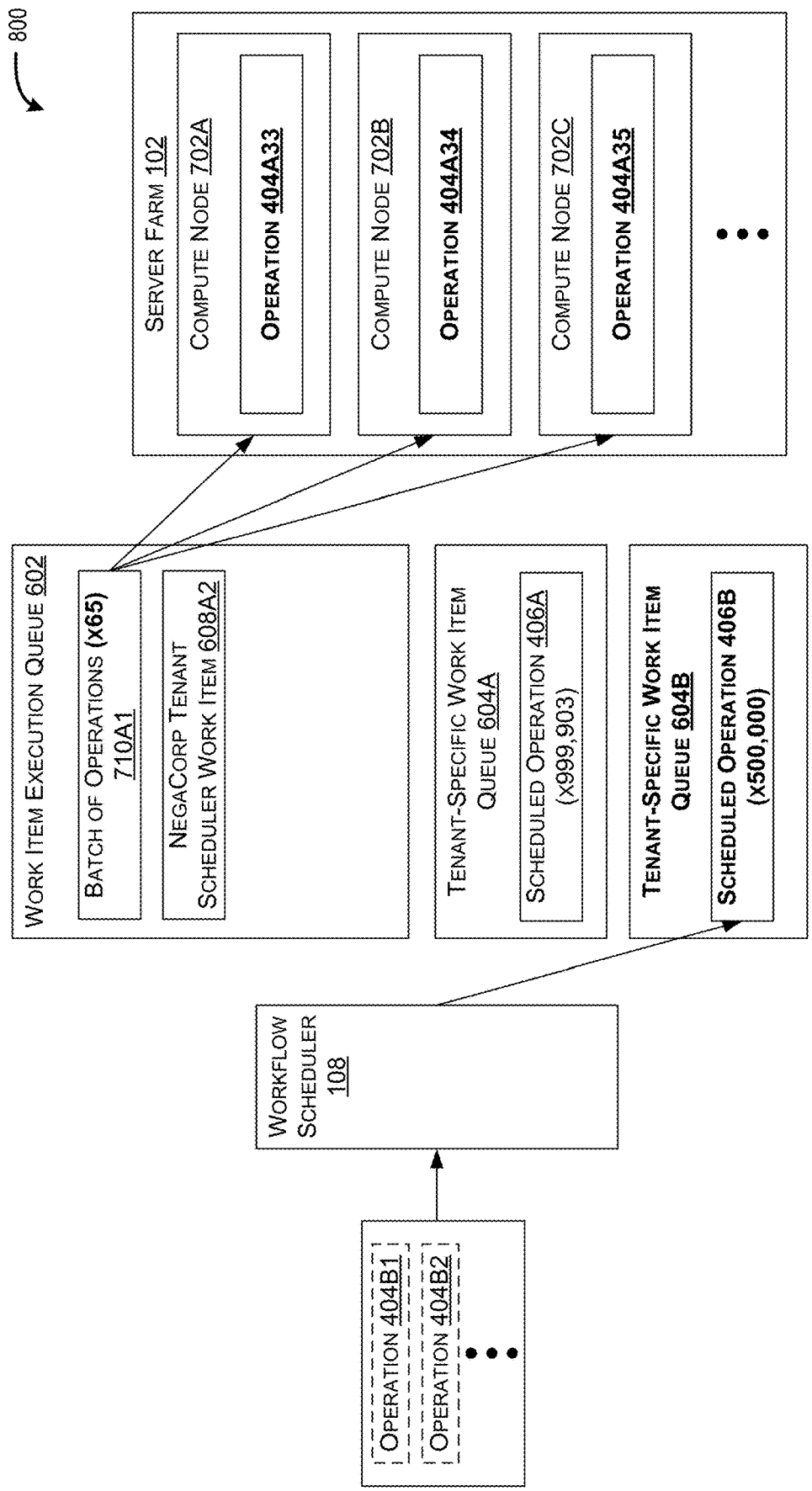
FIG. 8A is a block diagram illustrating a workflow scheduler adding requested operations to another tenant-specific work item queue while compute nodes process queued operations.

FIG. 8A is a block diagram 800 illustrating a workflow scheduler 108 adding requested operations 404B to tenant-specific work item queue 406B while compute nodes 702 process queued operations 404A In some configurations, similar to the receipt of operations 404A, operations 404B may be received from a single user performing 500,000 operations, by 500,000 users each performing one operation, or some smaller number of users each requesting at least one operation.

In some configurations, operations 404B are stored in tenant-specific work item queue 604B (herein after "tenant-specific queue" 4068). Like tenant-specific queue 604A tenant-specific queue 604B may be stored in the same physical database table as execution queue 602.

In some configurations, while requested operations 404B are being queued in tenant-specific queue 604B, compute nodes 702 continue to process queued operations 404A from the batch of operations 710A1. At the rime of the illustration, 65 queued operations 404A remain in batch of operations 710A1.

Figure 8B:
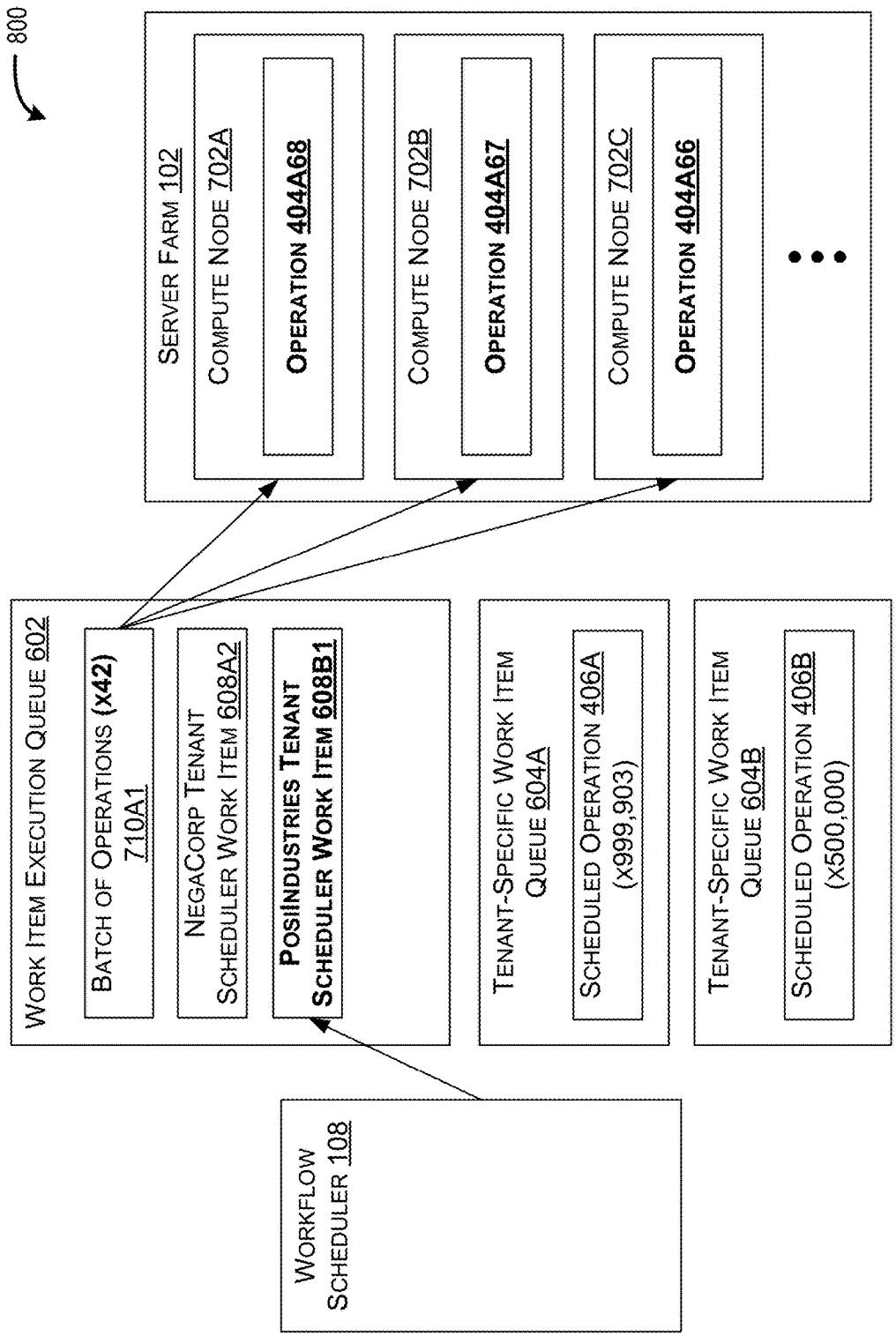
FIG. 8B is a block diagram illustrating a workflow scheduler adding a tenant scheduler to an execution queue while compute nodes process queued operations.

FIG. 8B is a block diagram 800 illustrating a workflow scheduler 108 adding a tenant scheduler 608B1 to execution queue 602 while compute nodes 702 process queued operations 404A. In some configurations, workflow scheduler 108 creates tenant scheduler 608B1 to schedule the execution of operations 404B.

In some configurations, while workflow scheduler is creating tenant scheduler 608B1 and adding it to execution queue 602, compute nodes 702 continue to process queued operations 404A from the batch of operations 710A1. At the time of the illustration, 42 queued operations 404A remain in batch of operations 710A1.

Figure 8C:
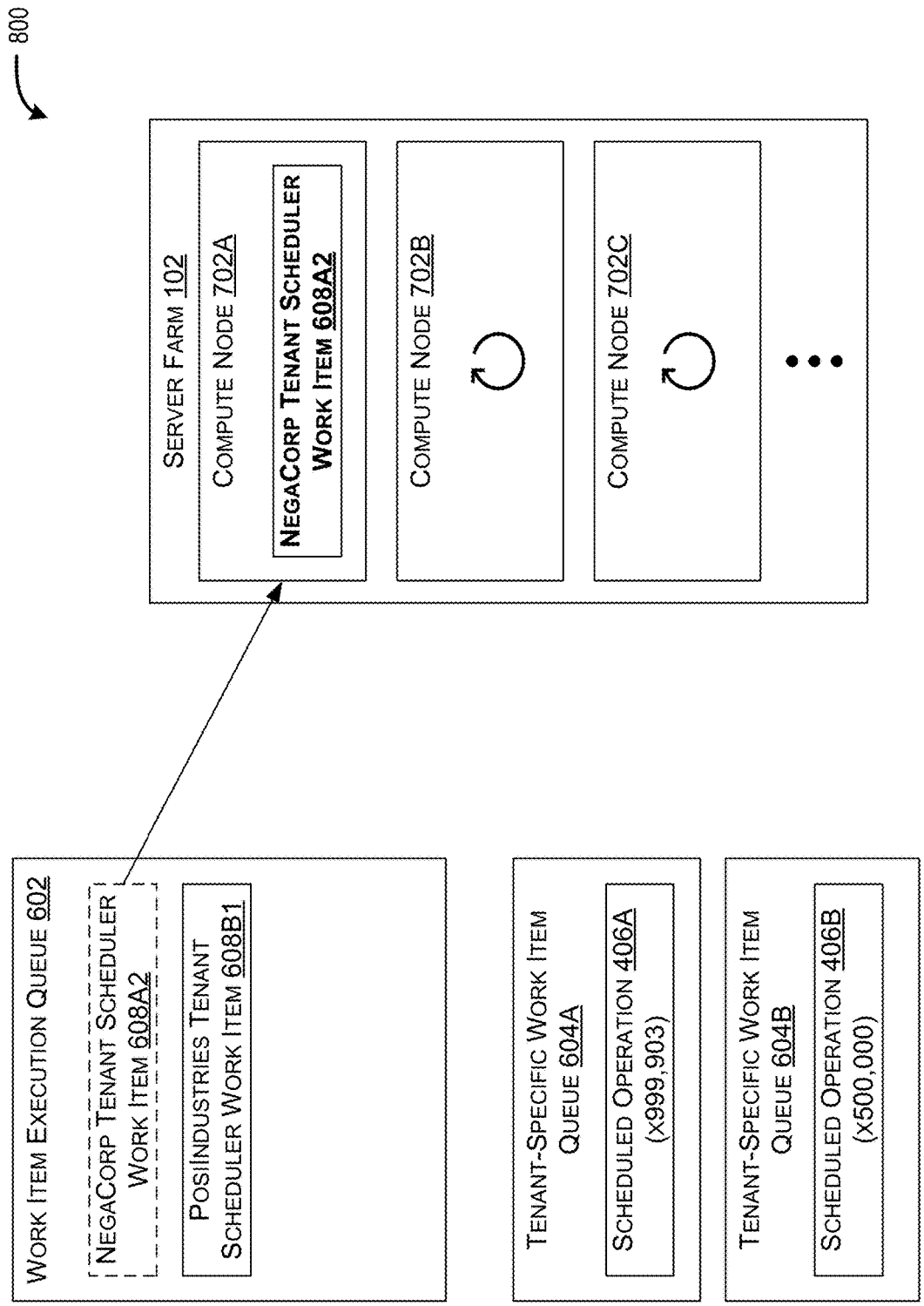
FIG. 8C is a block diagram illustrating a compute node executing a tenant scheduler retrieved from the execution queue after a previous batch of operations have finished executing.

FIG. 8C is a block diagram 800 illustrating a compute node 702A executing a tenant scheduler 608A2 retrieved from execution queue 602 after the hatch of operations 710A1 have finished executing.

Figure 8D:
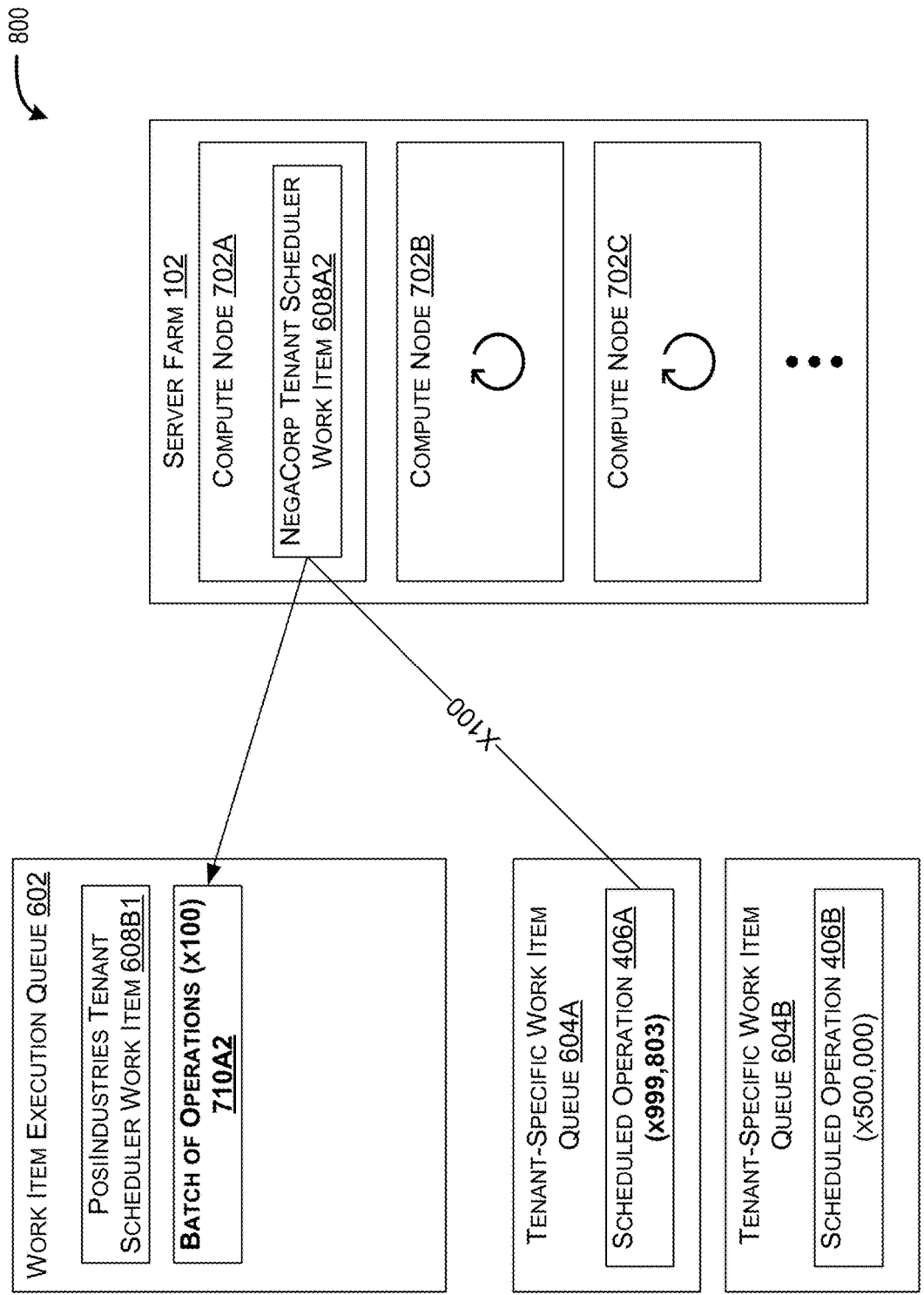
FIG. 8D is a block diagram illustrating a compute node executing a tenant scheduler to copy scheduled operations from a tenant queue to the execution queue.

FIG. 8D is a block diagram 800 illustrating a compute node 702A executing a tenant scheduler 608A2 to copy scheduled operations 406A from tenant queue 604A to the execution queue 602. In some configurations, a up to a defined number of scheduled operations 406A are copied from tenant queue 604A to execution queue 602. As illustrated in FIG. 8D, the defined number may be 100, and as such 100 scheduled operations 406A are selected as batch of operations 710A2 Tenant scheduler 608A2 adds batch of operations 710A2 to execution queue 602.

In some configurations, if some queued operations 404A remain in execution queue 602, then the number of scheduled operations 406A selected for batch of operations 710A2 would be reduced so that the total number of active queued operations 404 is less than or equal to the defined number. In some configurations, on active operation 404 is either in progress, i.e. being executed by one of compute notes 702, or queued in execution queue 602.

In some configurations, queued operations 404A may remain active from the last batch of operations 710A1 because dies are taking a long time to finish executing. For example, if one of the operations 404A from batch of queued operations 710A1 is taking longer to finish executing than it took for all of the batch of operations 710A1 to begin executing and for tenant scheduler 608A2 to begin selecting the next batch, then tenant scheduler 608A2 may select 90 scheduled operations 406 for the next batch.

Figure 8E:
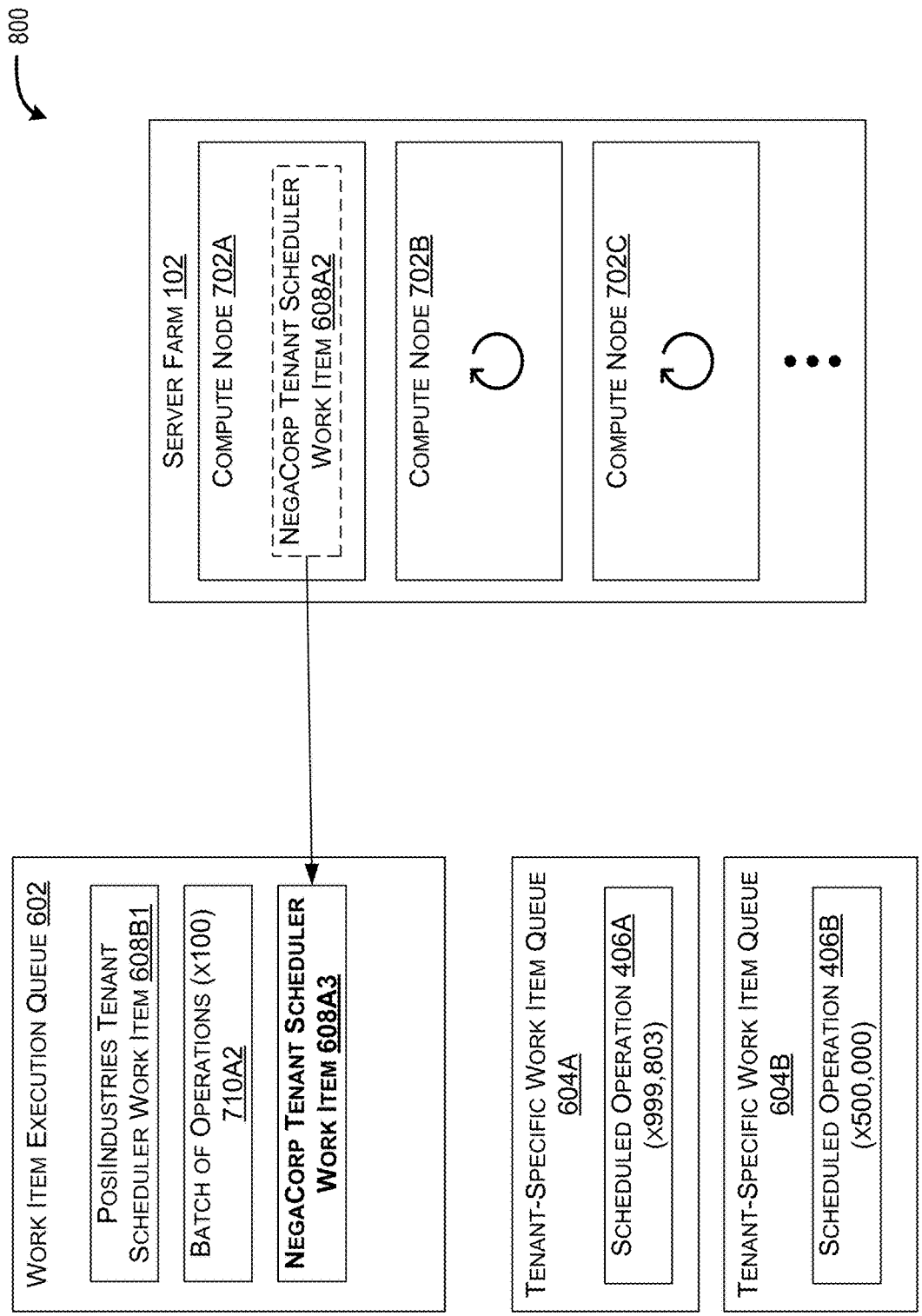
FIG. 8E is a block diagram illustrating a compute node executing a tenant scheduler to re-queue itself into the execution queue.

FIG. 8E is a block diagram 800 illustrating a compute node 702A executing a tenant scheduler 608A2 to re-queue itself into execution queue 602. As discussed above in conjunction with FIG. 7C, tenant scheduler 608A2 may copy itself into execution queue 602 as tenant scheduler 608A3, or tenant scheduler 608A2 may create a similar tenant scheduler 608A3 and add it to execution queue 602. By re-adding itself to execution queue 602, tenant scheduler 608A iteratively adds scheduled operations 406A to execution queue 602 in batches.

Figure 8F:
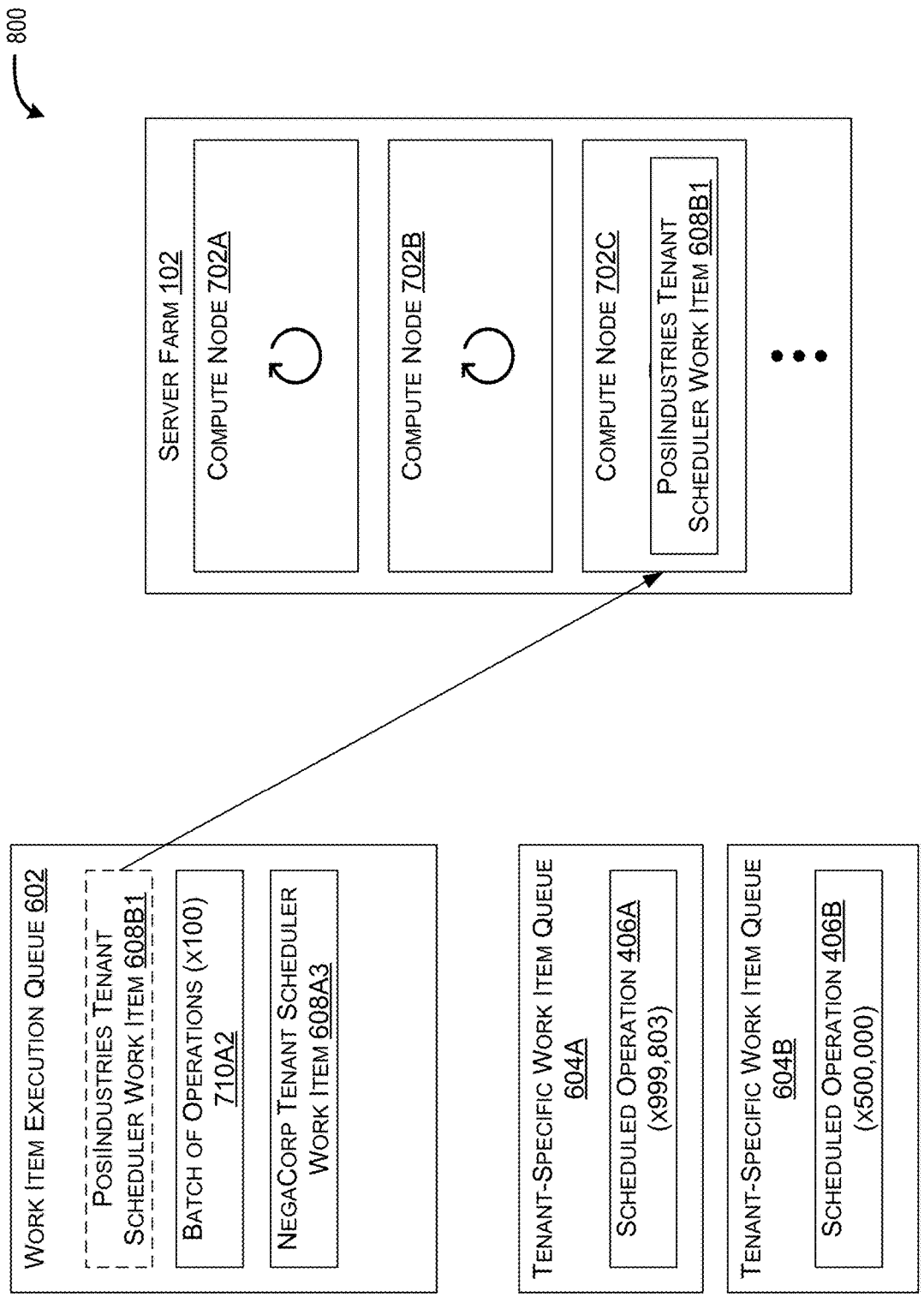
FIG. 8F is a block diagram illustrating a compute node executing another tenant scheduler from the execution queue.

FIG. 8F is a block diagram 800 illustrating a compute node 702C executing another tenant scheduler 608B1 retrieved from the execution queue 602. By executing tenant scheduler 608B1, operations 404B requested by tenant 202B are able to be queued for execution without first executing all 1,000,003 operations received from tenant 202A.

Figure 8G:
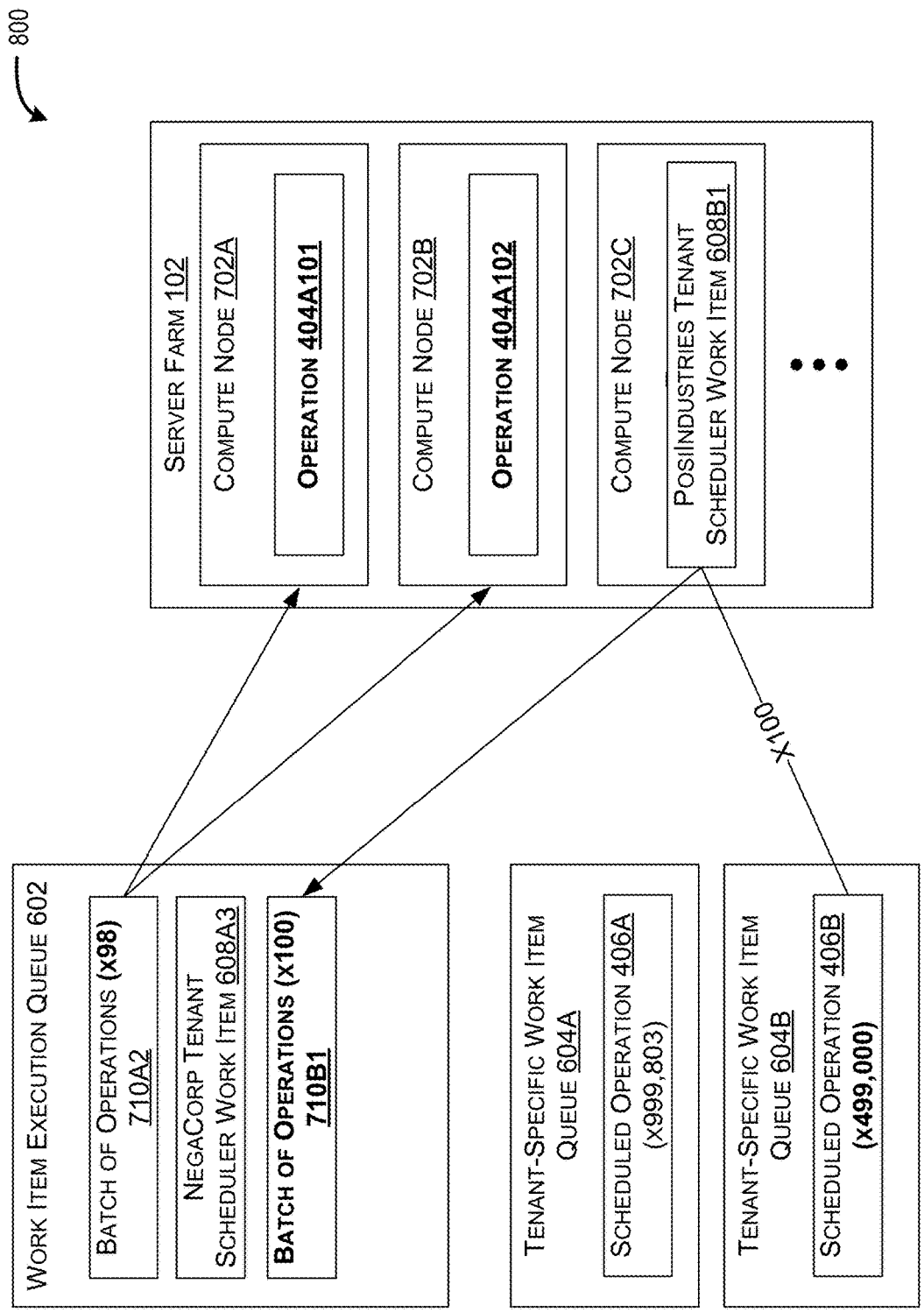
FIG. 8G is a block diagram illustrating a compute node executing the other tenant scheduler to add scheduled operations to the execution queue.

FIG. 8G is a block diagram 800 illustrating a compute node 702C executing tenant scheduler 608B1 to add scheduled operations 406B to the execution queue 602. In some configurations, the scheduled operations 406B are added to execution queue 602 as batch of operations 710B1 consisting of operations 404B. While tenant scheduler 608B1 is adding scheduled operations 406B to execution queue 602, other compute nodes 702 are beginning to retrieve and process queued operations 404A that are at the top of execution queue 602.

Figure 8H:
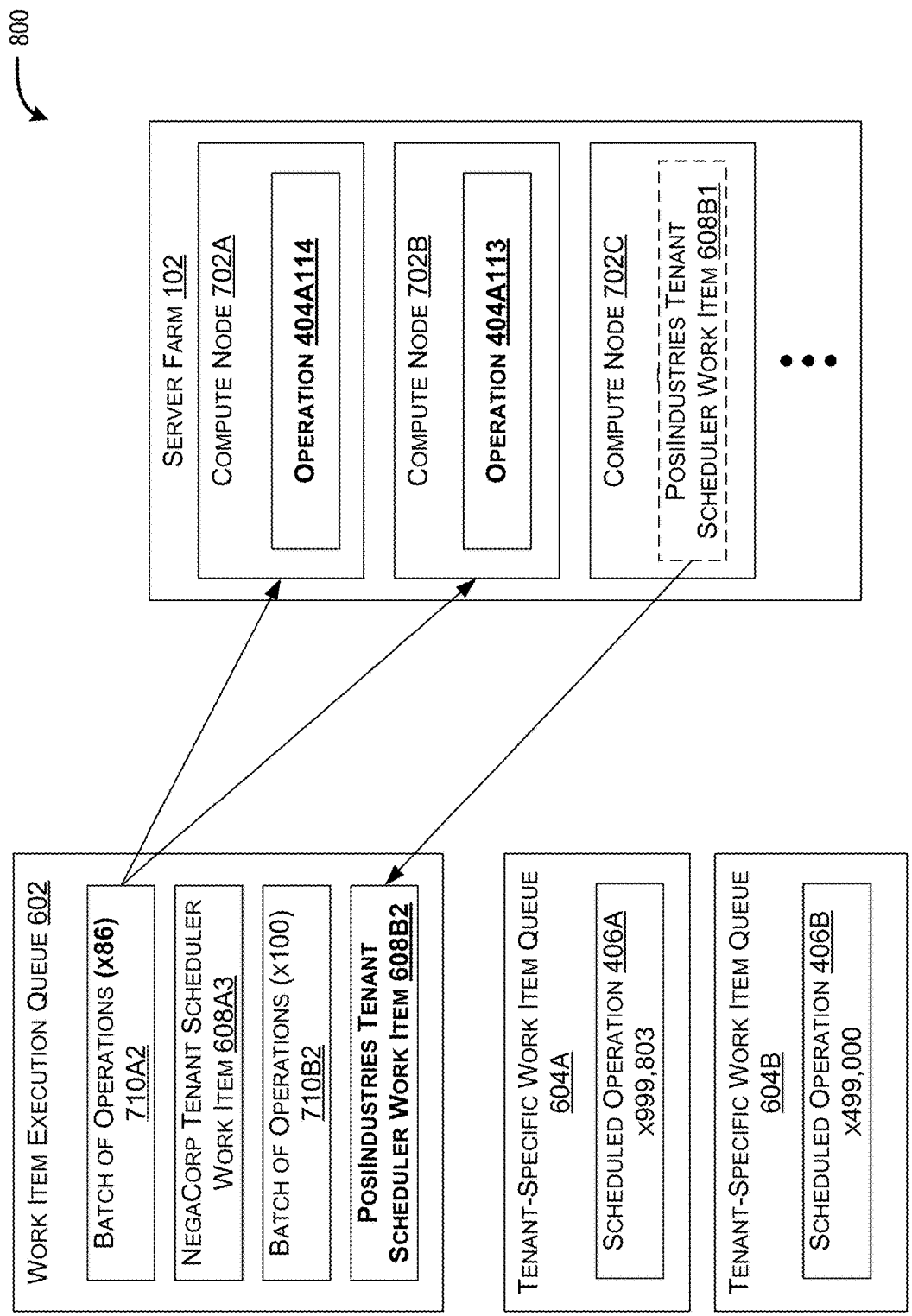
FIG. 8H is a block diagram illustrating a compute node executing the other tenant scheduler to re-add itself to the execution queue.

FIG. 8H is a block diagram 800 illustrating a compute node 702C executing tenant scheduler 608B1 to re-add itself to the execution queue 602. In some configurations, at least compute nodes 702A and 702B continue to execute queued operations 404A.

Figure 9:
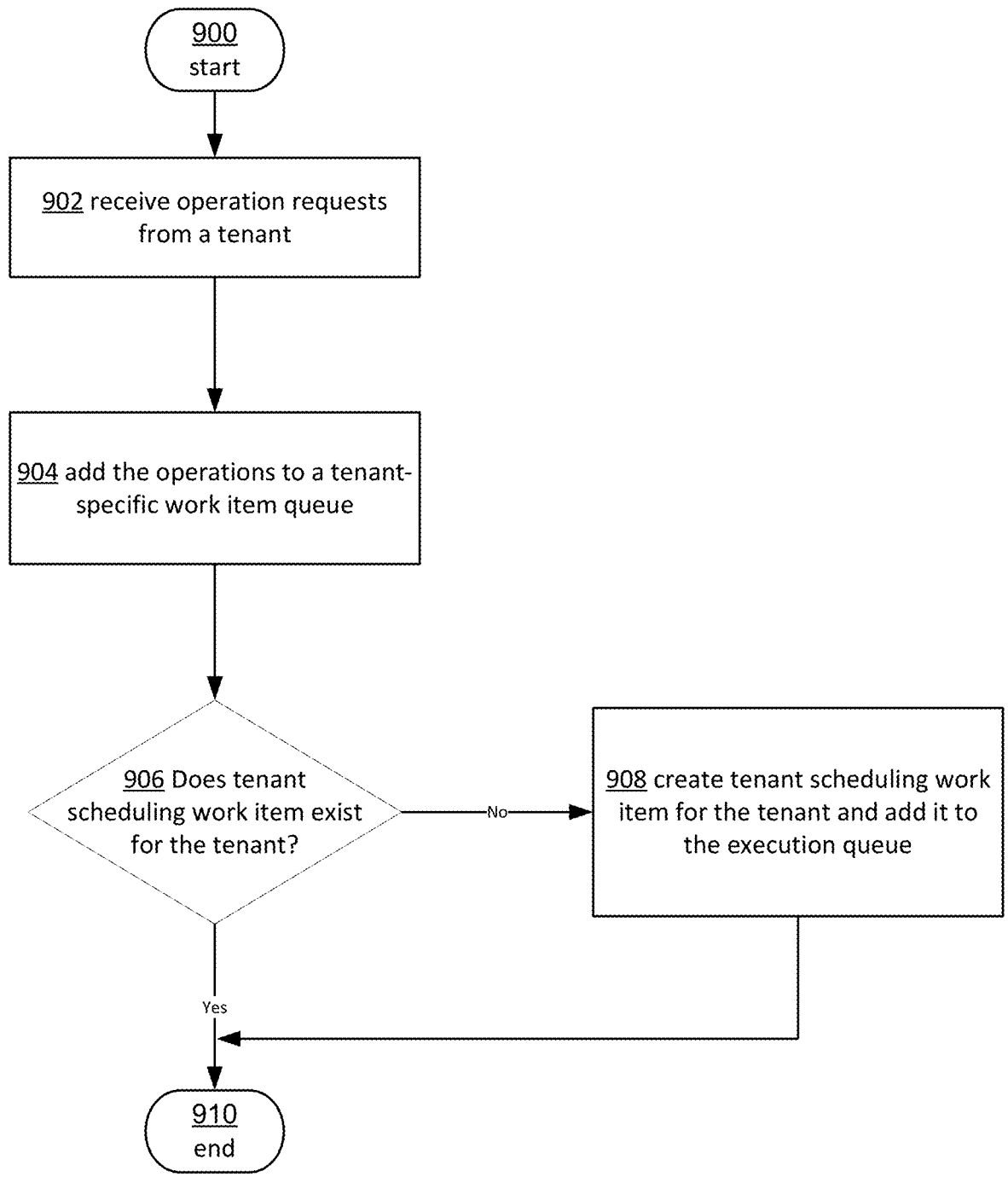
FIG. 9 is a flow diagram illustrating an example operational procedure, according to the described implementations.

Referring to FIG. 9, operation 900 begins the procedure. Operation 900 may be implemented by workflow scheduler 108, executing on one of compute nodes 702 of server farm 102. Operation 900 may be followed by Operation 902. Operation 902 illustrates receiving requests from a tenant to perform operations. Operation 902 may be followed by Operation 904. Operation 904 illustrates adding the received operations to a tenant-specific work item queue.

Operation 904 may be followed by Operation 906. Operation 906 illustrates deciding whether a tenant scheduling work item exist for the tenant. If the answer is yes, operation 906 is followed by operation 910, where operation 900 ends. If the answer is no, operation 906 may be followed by Operation 908. Operation 908 illustrates creating a tenant scheduling work item for the tenant and adding it to the execution queue 602. Operation 908 may be followed by Operation 910, where operation 900 ends.

Figure 10:
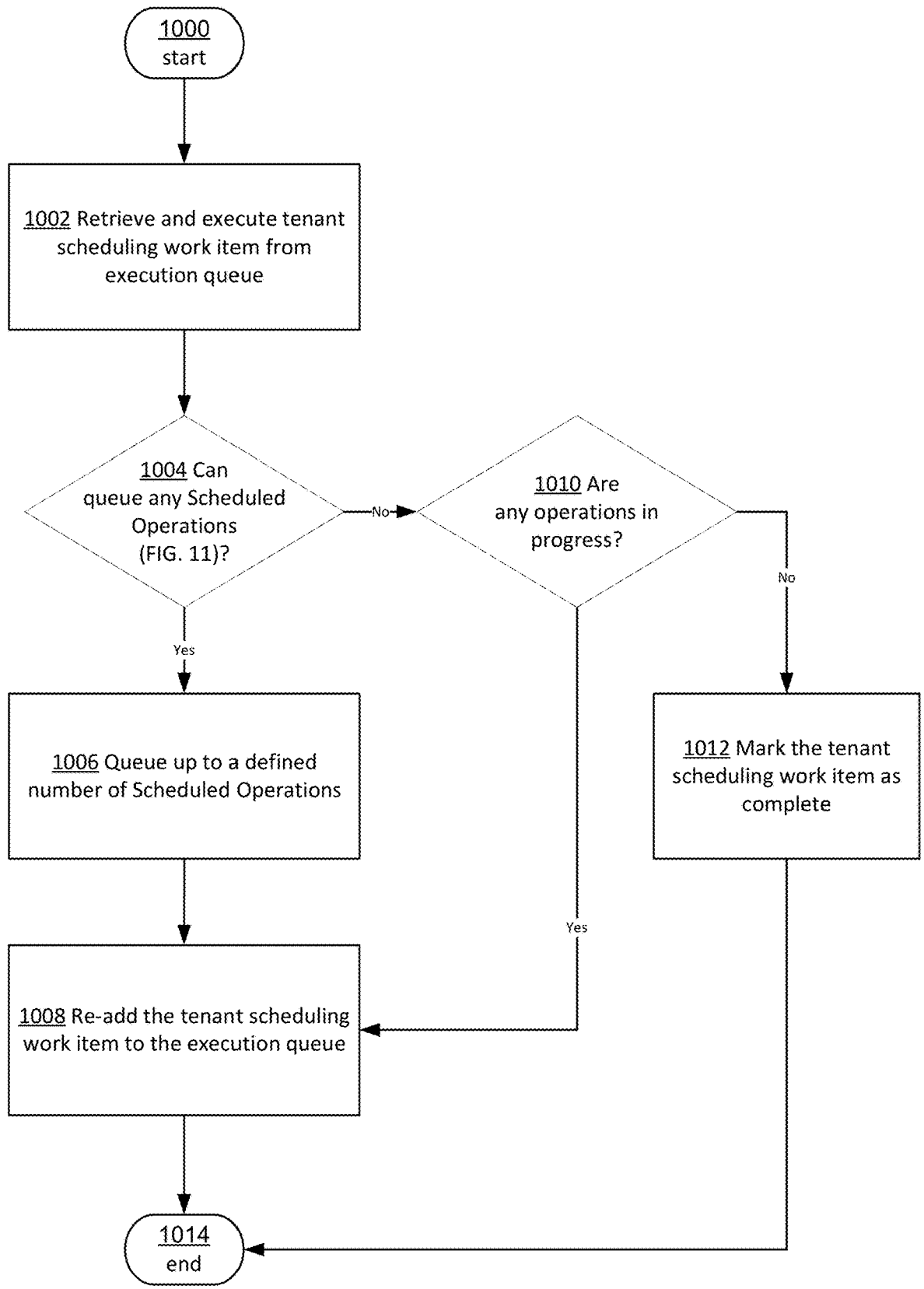
FIG. 10 is a flow diagram illustrating an example operational procedure, according to the described implementations.

Referring to FIG. 10, illustrated is an example operational procedure in accordance with the present disclosure Referring to FIG. 10, operation 1000 begins the procedure. Operation 1000 may be performed by a tenant scheduling work item 608 executing on a compute node 702. Operation 1000 may be followed by Operation 1902. Operation 1002 illustrates retrieving and executing a tenant scheduling work item from tire bead of execution queue 602.

Operation 1002 may be followed by Operation 1004. Operation 1004 illustrates determining whether any operations scheduled in a tenant-specific queue 604 can be added to execution queue 602. If the answer is yes, operation 1004 may be followed by Operation 1006.

If the answer is no, operation 1004 may be followed by operation 1010. Operation 1006 illustrates copying up to a defined number of scheduled operations from the tenant-specific queue 604 to execution queue 602.

Operation 1008 may be followed by operation 1008. Operation 1008 illustrates re-adding the tenant scheduling work item 406 to execution queue 602. Operation 1008 may be followed by operation 1014, where operation 1000 ends Operation 1010 illustrates determining if any operations received from the tenant are still being executed. If the answer is yes, operation 1010 may be followed by operation 1008. If the answer is no, then operation 1010 may be followed by operation 1012.

Operation 1012 illustrates marking the tenant scheduling work item complete, as all operations received from the tenant has finished executing. If a tenant scheduling work item is complete it may be deleted, freed, or allowed to be garbage collected. Operation 1012 may be followed by operation 1014, where operation 1000 ends.

Figure 11:
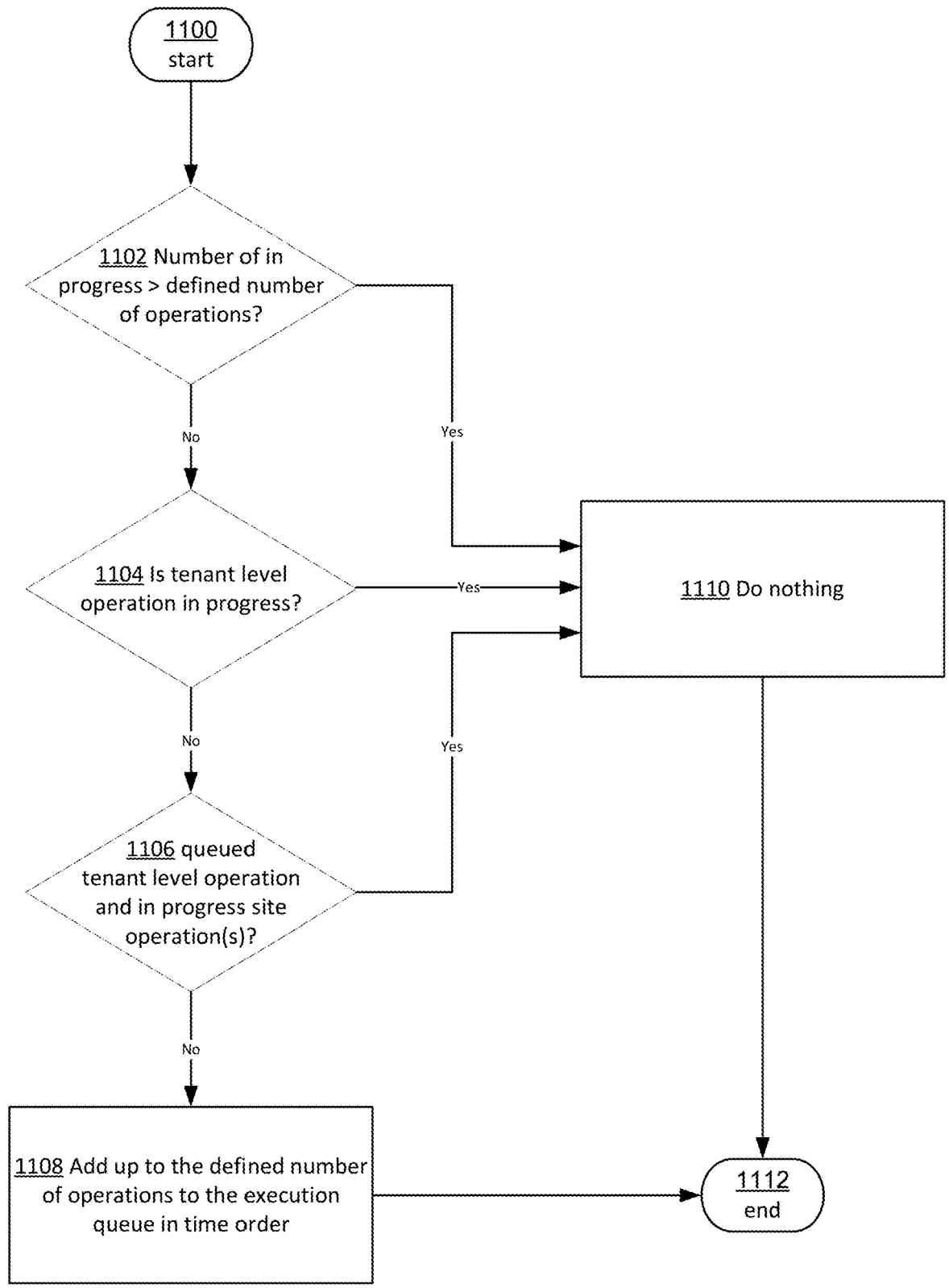
FIG. 11 is a flow diagram illustrating an example operational procedure, according to the described implementations.

Referring to FIG. 11, illustrated is an example operational procedure in accordance with the present disclosure. Referring to FIG. 11, operation 1100 begins the procedure. Operation 1100 may be performed by a tenant scheduling work item 608 executing on a compute node 702. In some configurations, operation 1100 performs the decision block 1004.

Operation 1100 may be followed by Operation 1102. Operation 1102 illustrates determining if a number of queued operations (and/or in-progress operations) is greater than the defined number of operations. If so, operation 1102 may be followed by operation 1110. If not, operation 1102 may be followed by operation 1104.

Operation 1104 illustrates determining whether a tenant level operation for the tenant is already in progress. If so, operation 1104 may proceed to operation 1106. If not, operation 1104 may proceed to operation 1100 Operation 1106 illustrates determining whether execution queue 602 includes a queued tenant level operation, and whether one or more site level operations are in progress. If the answer is no, then operation 1106 may proceed to operation 1108. If the answer is yes, operation 1106 may proceed to operation 1100.

Operation 1108 illustrates adding up to the defined number of scheduled operations from a tenant-specific queue 604 to execution queue 602 in time order—i.e. scheduled operations are added to execution queue 602 in the order in which they were received. Operation 1108 may proceed to operation 1112, where process 1100 ends Operation 1110 illustrates doing nothing—i.e. ignoring any request. By doing nothing, operation 1110 is allowing operations already in execution queue 602 to be processed.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions." and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein its being implemented, at least in pan, by system components, which can compose an application, component and/or a circuit. In some configurations, the system components include a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of FIG. 1-11, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

Figure 12:
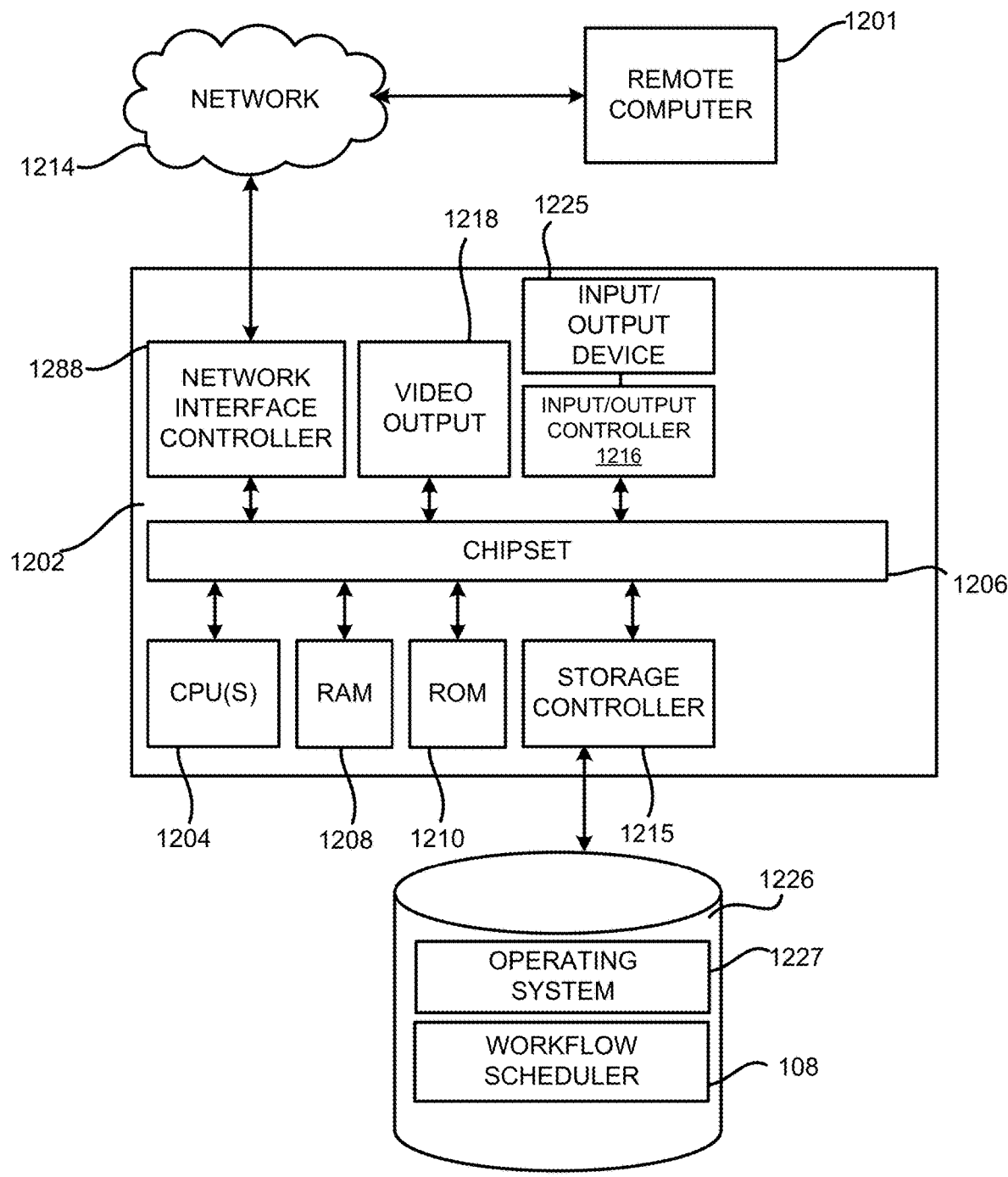
FIG. 12 is a computer architecture diagram illustrating a computing device architecture for a computing device capable of implementing aspects of the techniques and technologies presented herein.

FIG. 12 shows additional details of an example computer architecture capable of various aspects of the embodiments described above. The computer architecture shown in FIG. 12 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 12 may be utilized to execute any of the software components described above.

The computer architecture includes a baseboard 1202, or "motherboard," which is a printed circuit board to which a multitude of components or devices may be connected by way of a system bus or other electrical communication paths. In one illustrative embodiment, one or more central processing units ("CPUs") 1204 operate in conjunction with a chipset 1206. The CPUs 1204 may be standard programmable processors that perform arithmetic and logical operations necessary for the operation of the computer architecture.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more: complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer architecture. The chipset 1206 may further provide an interface to a computer-readable storage medium such as a read-only memory ("ROM") 1210 or non-volatile RAM ("NVRAM") for storing basic routines that help to startup the computing device and to transfer information between the various components and devices. The ROM 1210 or NVRAM may also store other software components necessary for the operation of the computer architecture in accordance with the embodiments described herein.

The computer architecture may operate in a networked environment using logical connections to remote computing devices and computer systems through a network 1214, such as the local area network. The chipset 1206 may include functionality for providing network connectivity fit rough a network interface controller (NIC) 1288, such as a gigabit Ethernet adapter. The NIC 1288 is capable of connecting the computer architecture to other computing devices over the network 1214. It should be appreciated that multiple NICs 1288 may be present in the computer architecture, connecting the computer to other types of networks and remote computer systems. The network allows the computer architecture to communicate with remote services and servers, such as the remote computer 1201. As can be appreciated, the remote computer 1201 may be a compute node 702 or any other computing device that is part of server farm 102. In addition, as described above, the remote computer 1201 may mirror and reflect data stored on the computer architecture and host services that may provide data or processing for the techniques described herein.

The computer architecture may be connected to a mass storage device 1226 that provides non-volatile storage for the computing device. The mass storage device 1226 may store system programs, application programs, other program modules, and data, which have been described in greater detail herein. The mass storage device 1226 may be connected to the computer architecture through a storage controller 1215 connected to the chipset 1206. The mass storage device 1226 may consist of one or more physical storage units. The storage controller 1215 may interface with the physical storage units through a serial attached SCSI ("SAS") interface, a serial advanced technology attachment ("SATA") interface, a fiber channel ("PC") interface, or other type of interface for physically connecting and transferring data between computers and physical storage units. It should also be appreciated that the mass storage device 1226, other storage media and the storage controller 1215 may include MultiMediaCard (MMC) components, eMMC components, Secure Digital (SD) components, PCI Express components, or the like.

The computer architecture may store data on the mass storage device 1226 by transforming the physical state of the physical storage units to reflect the information being stored. The specific transformation of physical state may depend on various factors, in different implementations of this description Examples of such factors may include, but are not limited to, the technology used to implement foe physical storage units, whether the mass storage device 1226 is characterized as primary or secondary storage, and foe like.

For example, the computer architecture may store information to the mass storage device 1226 by issuing instructions through the storage controller 1215 to alter the magnetic characteristics of a particular location within a magnetic disk drive unit, the reflective or refractive characteristics of a particular location in an optical storage unit, or the electrical characteristics of a particular capacitor, transistor or other discrete component in a solid-state storage unit. Other transformations of physical media are possible without departing from the scope and spirit of the present description, with the foregoing examples provided only to facilitate this description. The computer architecture may further read information from the mass storage device 1226 by detecting the physical states or characteristics of one or more particular locations within the physical storage units.

In addition to the mass storage device 1226 described above, the computer architecture may have access to other computer-readable media to store and retrieve information, such as program modules, data structures, or other data. As the operating system 1227, the workflow scheduler 108, other data and other modules are depicted as data and software stored in foe mass storage device 1226, it should be appreciated that these components and/or other modules may be stored, at least in part, in other computer-readable storage media of the computer architecture Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 1226 may store an operating system 1227 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 1226 may store other system or application programs and data utilized by the computer architecture, such as any of the other software components and data described above. The mass storage device 1226 might also store other programs and data not specifically identified herein.

In one embodiment the mass storage device 1226 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 1204 transition between states, as described above. According to one embodiment, the computer architecture has access to computer-readable storage media storing computer-executable instructions which, when executed by the computer architecture, perform the various routines described above with regard to FIG. 12, and the other FIGURES. The computing device might also include computer-readable storage media for performing any of the other computer-implemented operations described herein.

The computer architecture may also include one or more input/output controllers 1216 for receiving and processing input from a number of input devices, such as a key board, a mouse, a microphone, a headset, a touchpad, a touch screen, an electronic stylus, image processing and gesture recognition devices, or any other type of input device. The input/output controller 1216 is in communication with an input/output device 1225. The input/output controller 1216 may provide output to a display, such as a computer monitor, a flat-panel display, a digital projector, a printer, a plotter, or other type of output device. The input/output controller 1216 may provide input communication with other devices such as a microphone, a speaker, game controllers and/or audio devices.

For example, the input/output controller 1216 can be an encoder and the input/output device 1225 can include a full speaker system having a plurality of speakers. The encoder can use a spatialization technology, and the encoder can process audio output audio or output signals received from the application 1229. The encoder can utilize a selected spatialization technology to generate a spatially encoded stream that appropriately renders to the input/output device 1225.

The disclosure presented herein may be considered in view of the following clauses Example 1; A computer-implemented method for scheduling operations, the method comprising, receiving a plurality of requests to perform operations from one of a plurality of tenants of a distributed computing system; adding the plurality of operations to a tenant-specific queue as a plurality of scheduled operations: adding a tenant scheduling work item to an execution queue, wherein the tenant scheduling work item causes one of a plurality of compute nodes to: create a batch of operations by selecting up to a defined number of scheduled operations from the plurality of scheduled operations, add the batch of operations to the execution queue, and re-add die tenant scheduling work item to the execution queue: and wherein at least one of the plurality of compute nodes executes the batch of operations.

Example 2: The computer-implemented method of Example 1, the method further comprising: receiving a second plurality of operations from a second of the plurality of tenants; queuing the second plurality of operations in a second tenant-specific queue as a second plurality of scheduled operations; queuing a second tenant scheduling work item in the execution queue before the tenant-scheduling work item adds all of the plurality of scheduled operations to the execution queue.

Example 3: The computer-implemented method of Example 1, wherein the execution queue and the tenant specific queue are stored in the same database table.

Example 4: The computer-implemented method of Example 3, wherein scheduled operations stored in the tenant specific queue, queued operations stored in the execution queue, and tenant scheduling work items stored in the execution queue are represented with columns in the same database table, the columns comprising a site identifier column, a parent identifier column that refers to the tenant scheduler, an operation type column that refers to whether the operation is scheduled in the tenant specific queue or the execution queue, and a processing state column that refers to whether the operation is scheduled, queued, started, or completed.

Example 5: The computer-implemented method of Example 4, the method further comprising: querying the database table to identify operations from die one of the plurality of tenants, grouping by the operation type column and the processing state column; and querying live database table to identify operations from the one of the plurality of tenants, grouping by the site identifier column.

Example 6: The computer-implemented method of Example 5, wherein the tenant scheduling work item selects up to the defined number of scheduled operations by adding scheduled operations to the batch until a number of queued operations in the execution queue plus the number of scheduled operations already added to the batch equals the defined number.

Example 7: The computer-implemented method of Example 5, wherein the plurality of operations include tenant level operations that perform administrative operations on the tenant, and wherein the plurality of operations include application specific operations that perform functionality particular to the distributed computing system.

Example 8: The computer-implemented method of Example 7, wherein the tenant scheduling work item stops adding scheduled operations to the batch when a tenant level operation is being executed by one of the plurality of compute nodes.

Example 9: The computer-implemented method of Example 7, wherein the tenant scheduling work item stops adding scheduled operations to the batch when a tenant level operation is queued in the execution queue and one or more application specific operations are being executed by one or more of the plurality of compute nodes.

Example 10. A computing device comprising: one or more processors; a memory in communication with the one or more processors, the memory having computer-readable instructions stored thereupon which, when executed by the one or more processors, cause the computing device perform operations comprising: receiving a first plurality of requests for operations from a first of a plurality of tenants of a distributed computing system, adding the first plurality of operations to a first tenant-specific queue as a first plurality of scheduled operations; adding a first tenant scheduling work item to an execution queue, wherein the first tenant scheduling work item causes one of a plurality of compute nodes to: create a first batch of operations by selecting up to a defined number of scheduled operations from the first plurality of scheduled operations, add the first batch of operations to the execution queue, and re-add the first tenant scheduling work item to the execution queue: receiving a second plurality of operations from a second of the plurality of tenants of the distributed computing system; queuing the second plurality of operations in a second tenant-specific queue as a second plurality of scheduled operations: adding a second tenant scheduling work item to the execution queue before the first batch of operations have been executed.

Example 11: The computing device of Example 10, wherein the re-added first tenant scheduling work item is executed by one of the plurality of compute nodes, causing another batch of operations received from the first tenant to be added to the execution queue.

Example 12: The computing device of Example 10, wherein the scheduled operations selected for inclusion in the first batch of operations are selected in the order they were received by the distributed computing system.

Example 13: The computing device of Example 10, wherein die execution queue comprises operations from the first tenant intermixed with operations from the second tenant.

Example 14 The computing device of Example 10, wherein two or more of the plurality of compute nodes execute the second tenant scheduling work item and one or more of the first plurality of operations in parallel.

Example 15. A computer-readable medium having encoded thereon computer-executable instructions that, when executed, cause one or more processing units of a computing device to execute a method comprising receiving a plurality of requests for operations from one of a plurality of tenants of a distributed computing system: adding the plurality of operations to a tenant-specific queue as a plurality of scheduled operations; adding a tenant scheduling work item to an execution queue, wherein the tenant scheduling work item causes one of a plurality of compute nodes to create a batch of operations by selecting from the plurality of scheduled operations in the tenant-specific queue until at least one of a plurality of conditions are met, add the hatch of operations to the execution queue, and re-add the tenant scheduling work item to the execution queue: and wherein at least one of the plurality of compute nodes executes the batch of operations.

Example 16. The computer-readable medium of Example 15, wherein the batch of operations is created by selecting from the plurality of scheduled operations in the order the operations w ere received from the one of the plurality of tenants.

Example 17: The computer-readable medium of Example 16, wherein operations may be associated with a delivery date and time, and wherein operations are not added to die batch until a current date and time is at least the delivery date and time.

Example 18: The computer-readable medium of Example 17, wherein the re-added tenant scheduling work item is associated with a delivery date and time that is a defined amount of time after the tenant scheduling work item was re-added to the execution queue.

Example 19: The computer-readable medium of Example 15, wherein the scheduled operations comprise tenant level operations and application specific operations, and wherein the scheduled operations are selected for inclusion in the batch in the order they were received until a tenant level operation is being executed by one of the plurality of compute nodes, or a tenant level operation exists in the execution queue and one or more application specific operations are being executed by one or more of the plurality of compute nodes.

Example 20: The computer-readable medium of Example 15, wherein the operations comprise tenant level operations and site-specific operations, and wherein executing the batch of operations includes executing any tenant level operations in series while operations from different sites may be executed in parallel.

Each of the processes, methods and algorithms described in die preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub combinations are intended to fall within the scope of this disclosure, in addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application specific integrated circuits (ASIC's), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein Thus, nothing in the foregoing description is intended to imply that any particular feature, characteristic, step, module or block is necessary or indispensable, indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A computer-implemented method for scheduling operations in a distributed computing system including a plurality of compute nodes, the method comprising:
   receiving a plurality of requests, wherein each request is to perform a plurality of operations from a respective tenant of a plurality of tenants of the distributed computing system;
   for each request received from its respective tenant:
      adding the plurality of operations as entries to a respective tenant-specific queue associated with the respective tenant as a plurality of scheduled operations; and
      adding a tenant scheduling work item for the respective tenant as an entry to an execution queue for execution among the plurality of compute nodes;
   executing, by the plurality of compute nodes, the entries added to the execution queue in the order added, wherein the executing comprises:
      executing, on at least one of the plurality of compute nodes, a first tenant scheduling work item entry for a first respective tenant in the execution queue, including:
         selecting a batch of tenant operations up to a defined number of operations from the tenant-specific queue associated with the first tenant, wherein the defined number prevents the operations from the first tenant executing on at least one of the plurality of compute nodes from stalling execution of operations from others of the plurality of tenants on the plurality of compute nodes;
         add the tenant operations in the batch as entries to the execution queue, and
         re-add the tenant scheduling work item for the first tenant to the end of the execution queue after the batch of tenant operations; and
      for a batch of tenant operations in the execution queue, executing the batch of operations among the plurality of compute nodes, wherein subsequent execution of the re-added tenant scheduling work item includes selecting a next batch of the defined number of operations remaining in the respective tenant-specific queue for execution among the compute nodes.

2. The computer-implemented method of claim 1, wherein the executing further comprising comprises:
   executing, on at least one of the plurality of compute nodes, a second tenant scheduling work item entry for a second respective tenant in the execution queue.

3. The computer-implemented method of claim 1, wherein the execution queue and the respective tenant-specific queues are stored in a single database table.

4. The computer-implemented method of claim 1, wherein scheduled operations stored in one of the respective tenant specific queues, queued operations stored in the execution queue, and tenant scheduling work items stored in the execution queue are represented with columns in a single database table, the columns comprising: a site identifier column, a parent identifier column that refers to the tenant scheduler, an operation type column that refers to whether the operation is scheduled in the tenant specific queue or the execution queue, and a processing state column that refers to whether the operation is scheduled, queued, started, or completed.

5. The computer-implemented method of claim 4, the method further comprising:
  querying the database table to identify operations from the one of the plurality of tenants, grouping the result of the querying by the operation type column and the processing state column; and
  querying the database table to identify operations from the one of the plurality of tenants, grouping the result of the querying by the site identifier column.

6. The computer-implemented method of claim 1, wherein one of the tenant scheduling work items selects up to the defined number of scheduled operations associated with the one of the respective tenant scheduling work items by adding scheduled operations associated with the one of the respective tenant scheduling work items to the batch until a number of queued operations in the execution queue plus the number of scheduled operations already added to the batch equals the defined number.

7. The computer-implemented method of claim 1, wherein the plurality of operations for a respective tenant include tenant level operations that perform administrative operations on the respective tenant, and wherein the plurality of operations include application specific operations that perform functionality particular to the distributed computing system.

8. The computer-implemented method of claim 1, wherein a respective tenant scheduling work item stops adding respective scheduled operations to the batch when a tenant level operation is being executed by one of the plurality of compute nodes.

9. The computer-implemented method of claim 1, wherein a respective tenant scheduling work item stops adding respective scheduled operations to the batch when a tenant level operation is queued in the execution queue and one or more application specific operations are being executed by one or more of the plurality of compute nodes.

10. The computer-implemented method of claim 1, further comprising:
  adding the first tenant scheduling work item for the first tenant to the execution queue;
  after the adding of the first tenant scheduling work item, adding a second tenant scheduling work item for a second tenant to the execution queue;
  after the adding of the second tenant scheduling work item, executing the first tenant scheduling work item including adding, to the execution queue, a first batch of work items from the tenant-specific queue for the first tenant and adding, to the execution queue, a third tenant scheduling work item for a third tenant; and
  executing the second tenant scheduling work item prior to executing the third tenant scheduling work item.

11. A computing device comprising:
  one or more processors;
  a memory in communication with the one or more processors, the memory having computer-readable instructions stored thereupon which, when executed by the one or more processors, cause the computing device to perform operations comprising:
    receiving a plurality of requests, wherein each request is to perform a plurality of operations from a respective tenant of a plurality of tenants of a distributed computing system;
    for each request received from its respective tenant:
      adding the plurality of operations as entries to a respective tenant-specific queue associated with the respective tenant as a plurality of scheduled operations; and
      adding a tenant scheduling work item for the respective tenant as an entry to an execution queue for execution among a plurality of compute nodes of the distributed computing system
    executing, by the plurality of compute nodes, the entries added to the execution queue in the order added, wherein the executing comprises:
      executing, on at least one of the plurality of compute nodes, a first tenant scheduling work item entry for a first respective tenant in the execution queue, including:
        selecting a batch of tenant operations up to a defined number of operations from the tenant-specific queue associated with the first tenant, wherein the defined number prevents the operations from the first tenant executing on at least one of the plurality of compute nodes from stalling execution of operations from others of the plurality of tenants on the plurality of compute nodes,
        add the tenant operations in the batch as entries to the execution queue, and
        re-add the tenant scheduling work item for the first tenant to the end of the execution queue after the batch of tenant operations; and
      for a batch of tenant operations in the execution queue, executing the batch of operations among the plurality of compute nodes, wherein subsequent execution of the re-added tenant scheduling work item includes selecting a next batch of the defined number of operations remaining in the respective tenant-specific queue for execution among the compute nodes;
    wherein the respective tenant-specific queues and the execution queue are stored in the same database table of work items, wherein a column in the database table indicates which queue a work item entry in the database table belongs to, and wherein the adding the tenant operations to the execution queue includes updating the column based on the tenant operations.

12. The computing device of claim 11, wherein the scheduled operations selected for inclusion in the batch of operations are selected in the order they were received by a distributed computing system.

13. The computing device of claim 11, wherein the execution queue comprises operations from the one tenant intermixed with operations from another tenant.

14. A non-transitory computer-readable storage medium having stored thereon computer-executable instructions that, when executed, cause one or more processing units of a computing device to execute a method comprising:
  receiving a plurality of requests, wherein each request is to perform a plurality of operations from a respective tenant of a plurality of tenants of a distributed computing system;
  for each request received from its respective tenant:
    adding the plurality of operations as entries to a respective tenant-specific queue associated with the respective tenant as a plurality of scheduled operations; and
    adding a tenant scheduling work item for the respective tenant as an entry to an execution queue for execution among a plurality of compute nodes of the distributed computing system
  executing, by the plurality of compute nodes, the entries added to the execution queue in the order added, wherein the executing comprises:

executing, on at least one of the plurality of compute nodes, a first tenant scheduling work item entry for a first respective tenant in the execution queue, including:
  selecting a batch of tenant operations up to a defined number of operations from the tenant-specific queue associated with the first tenant, wherein the defined number prevents the operations from the first tenant executing on at least one of the plurality of compute nodes from stalling execution of operations from others of the plurality of tenants on the plurality of compute nodes,
  add the tenant operations in the batch as entries to the execution queue, and
  re-add the tenant scheduling work item for the first tenant to the end of the execution queue after the batch of tenant operations; and
for a batch of tenant operations in the execution queue, executing the batch of operations among the plurality of compute nodes, wherein subsequent execution of the re-added tenant scheduling work item includes selecting a next batch of the defined number of operations remaining in the respective tenant-specific queue for execution among the compute nodes.

15. The computer-readable medium of claim 14 wherein the respective batch of operations is created by selecting from the respective plurality of scheduled operations associated with a respective tenant scheduling work item in the order the operations were received from the one of the plurality of tenants.

16. The computer-readable medium of claim 14, wherein operations may be associated with a delivery date and time, and wherein operations are not added to the batch until a current date and time is at least the delivery date and time.

17. The computer-readable medium of claim 14, wherein the respective re-added tenant scheduling work item is associated with a delivery date and time that is a defined amount of time after the respective tenant scheduling work item was re-added to the execution queue.

18. The computer-readable medium of claim 14, wherein the respective scheduled operations comprise tenant level operations and application specific operations, and wherein the respective scheduled operations are selected for inclusion in the batch in the order they were received until:
  a tenant level operation is being executed by one of the plurality of compute nodes, or
  a tenant level operation exists in the execution queue and one or more application specific operations are being executed by one or more of the plurality of compute nodes.

19. The computer-readable medium of claim 14, wherein the operations comprise tenant level operations and site-specific operations, and wherein executing the batch of operations includes executing any tenant level operations in series while operations from different sites may be executed in parallel.

* * * * *